United States Patent
Liu et al.

(10) Patent No.: US 12,191,954 B2
(45) Date of Patent: Jan. 7, 2025

(54) CHANNEL STATE INFORMATION FEEDBACK METHOD, DEVICE, TERMINAL, AND NETWORK SIDE, AND STORAGE MEDIUM

(71) Applicant: DATANG MOBILE COMMUNICATIONS EQUIPMENT CO., LTD., Beijing (CN)

(72) Inventors: Zhengxuan Liu, Beijing (CN); Qiubin Gao, Beijing (CN); Hui Li, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 265 days.

(21) Appl. No.: 17/794,253

(22) PCT Filed: Feb. 9, 2021

(86) PCT No.: PCT/CN2021/076244
§ 371 (c)(1),
(2) Date: Jul. 20, 2022

(87) PCT Pub. No.: WO2021/160122
PCT Pub. Date: Aug. 19, 2021

(65) Prior Publication Data
US 2023/0075037 A1   Mar. 9, 2023

(30) Foreign Application Priority Data

Feb. 10, 2020 (CN) .......................... 202010085292.9
Feb. 3, 2021 (CN) .......................... 202110152398.0

(51) Int. Cl.
*H04B 7/06* (2006.01)
*H04L 5/00* (2006.01)

(52) U.S. Cl.
CPC ......... *H04B 7/0626* (2013.01); *H04B 7/0617* (2013.01); *H04L 5/0048* (2013.01)

(58) Field of Classification Search
CPC .. H04B 7/0626; H04B 7/0617; H04B 7/0639; H04B 7/0456; H04B 7/0658; H04B 7/086; H04L 5/0048; H04L 1/0026
See application file for complete search history.

(56) References Cited

U.S. PATENT DOCUMENTS

2016/0182137 A1*   6/2016   Onggosanusi ....... H04B 7/0478
                                                              370/329
2019/0280750 A1*   9/2019   Rahman ............ H04L 25/03923
(Continued)

FOREIGN PATENT DOCUMENTS

CN   107113039 A   8/2017
CN   107980209 A   5/2018
(Continued)

OTHER PUBLICATIONS

Huawei et al.,"Proposals for CSI-RS and CSI feedback in TR", 3GPP TSG RAN WG1 Meeting #81, Fukuoka, Japan, May 25-29, 2015, total 5 pages, R1-152478.
(Continued)

*Primary Examiner* — Abdullahi Ahmed
(74) *Attorney, Agent, or Firm* — Kilpatrick Townsend & Stockton LLP

(57) ABSTRACT

Provided are a method and a device for channel state information, terminal, and network side, and a storage medium. The method includes: receiving beamformed CSI-RSs, or the beamformed CSI-RSs and frequency domain basis vector indication information transmitted by a network side by means of antenna ports, where beams used in beamforming are determined based on spatial domain basis vectors or based on the spatial domain basis vectors and frequency domain basis vectors, and the spatial domain
(Continued)

basis vectors and the frequency domain basis vectors are determined based on an uplink channel; determining port indication information and a port combination coefficient for data transmission based on the beamformed CSI-RS or the beamformed CSI-RS and the frequency domain basis vector indication information; and feeding back the port indication information and port combination coefficient to the network side for determining precoding of downlink transmission data at the network side.

20 Claims, 4 Drawing Sheets

(56) References Cited

U.S. PATENT DOCUMENTS

| | | | | |
|---|---|---|---|---|
| 2020/0106491 A1* | 4/2020 | Wu | .......................... | H04L 1/16 |
| 2020/0358509 A1* | 11/2020 | Wernersson | .......... | H04L 5/0051 |
| 2022/0231740 A1* | 7/2022 | Bhat | ..................... | H04L 1/0026 |
| 2024/0146364 A1* | 5/2024 | Liu | ...................... | H04B 7/0626 |
| 2024/0187059 A1* | 6/2024 | Liu | ...................... | H04B 7/0802 |

FOREIGN PATENT DOCUMENTS

| | | |
|---|---|---|
| CN | 108155922 A | 6/2018 |
| CN | 109565479 A | 4/2019 |
| CN | 110768700 A | 2/2020 |
| EP | 3576312 A1 | 12/2019 |
| WO | 2017118077 A1 | 7/2017 |

OTHER PUBLICATIONS

Fujitsu, "Discussion on beamformed CSI-RS-based scheme for EBF/FDMIMO", 3GPP TSG RAN WG1 Meeting #81, Fukuoka, Japan, May 25-29, 2015, total 5 pages, R1-152655.

CATT, "CSI feedback for beamformed CSI-RS on PUCCH", 3GPP TSG RAN WG1 Meeting #82, Beijing, China, Aug. 24-28, 2015, total 4 pages, R1-153945.

ZTE et al., "Hybrid CSI feedback for NR MIMO", 3GPP TSG RAN WG1 Meeting #88, Athens, USA, Jan. 16-20, 2017, total 7 pages, R1-1701808.

Korean Intellectual Property Office, Office Action Issued in Application No. 10-2022-7029814, Aug. 20, 2024, 6 pages.

ZTE, "CSI Enhancement for MU-MIMO Support", 3GPP TSG RAN WG1 Meeting #95, Spokane, USA, Nov. 12-16, 2018, total 11 pages, R1-1813913.

Huawei et al., "Discussion on CSI enhancement", 3GPP TSG RAN WG1 Meeting #98, Prague, Czech Republic, Aug. 26-30, 2019, total 14 pages, R1-1908065.

Nokia et al., "On UCI reporting of SCI and FD basis", 3GPP TSG RAN WG1 Meeting #96bis, Xi'an, China, Apr. 12-16, 2019, total 2 pages, R1-1905831.

* cited by examiner

CHANNEL STATE INFORMATION FEEDBACK METHOD, DEVICE, TERMINAL, AND NETWORK SIDE, AND STORAGE MEDIUM

CROSS-REFERENCE TO RELATED APPLICATIONS

The present application is a US National Stage of International Application No. PCT/CN2021/076244, filed on Feb. 9, 2021, which claims priority to Chinese Application No. 2020100852929 filed on Feb. 10, 2020, entitled "Channel State Information Feedback Method, Device, Terminal, Network Side, and Storage Medium", and Chinese Application No. 2021101523980 filed on Feb. 3, 2021, entitled "Channel State Information Feedback Method, Device, Terminal, Network Side, and Storage Medium", which are hereby incorporated by reference in their entireties.

FIELD

The present application relates to the field of wireless communication, and in particular, to a method and a device for feeding back channel state information, a terminal, a network side, and a storage medium.

BACKGROUND

In the 5th Generation New RAT (5G NR) system, channel state information (CSI) feedback is a key technology to achieve high-performance precoding.

Currently, for the Rel-16 enhanced port selection codebook, a terminal may perform singular value decomposition (SVD) calculation on each precoding matrix indicator (PMI) subband, and the terminal calculation complexity is high. Also, the terminal needs to calculate downlink delay information and report the downlink delay information to a network side, which brings large feedback overheads.

Therefore, when the channel state information is fed back, the high calculation amount and feedback overheads for the terminal will limit the improvement of the system performance.

SUMMARY

Embodiments of the present application provide a method and a device for feeding back channel state information, a terminal, a network side, and a storage medium, which solves the problem that the high calculation amount and feedback overheads for the terminal limit system performance during the traditional channel state information feedback.

In a first aspect, an embodiment of the present application provides a method for feeding back channel state information (CSI), including:
  receiving beamformed channel state information reference signals (CSI-RSs), or the beamformed CSI-RSs and frequency domain basis vector indication information transmitted by a network side by means of antenna ports; where beams used in beamforming are determined based on spatial domain basis vectors, or based on the spatial domain basis vectors and frequency domain basis vectors, and the spatial domain basis vectors and the frequency domain basis vectors are determined based on an uplink channel;
  determining port indication information and port combination coefficients for data transmission based on the beamformed CSI-RSs, or the beamformed CSI-RSs and the frequency domain basis vector indication information; and
  feeding back the port indication information and the port combination coefficients to the network side for determining precoding of downlink transmission data based on the port indication information and the port combination coefficients at the network side.

In an embodiment, the determining port indication information and port combination coefficient for data transmission based on the beamformed CSI-RSs, or the beamformed CSI-RSs and the frequency domain basis vector indication information, includes:
  determining multiple effective channel information based on the beamformed CSI-RSs, or the beamformed CSI-RSs and the frequency domain basis vector indication information; and
  determining the port indication information and the port combination coefficients for data transmission based on the multiple effective channel information.

In an embodiment, the receiving beamformed CSI-RSs, or the beamformed CSI-RSs and frequency domain basis vector indication information transmitted by a network side by means of antenna ports, includes:
  receiving first beamformed CSI-RSs transmitted by the network side by means of the antenna ports;
  where first beams used in beamforming the first CSI-RSs are determined based on all spatial domain basis vectors and all frequency domain basis vectors.

In an embodiment, the number of the spatial domain basis vectors is 2L, the number of the frequency domain basis vectors is M, and both L and M are positive integers;
  the number of the first beams is not less than 2L+M−1, where
  2L or more first beams are determined based on 2L spatial domain basis vectors, and M−1 or more first beams are determined based on a preset spatial domain basis vector and M−1 frequency domain basis vectors; the preset spatial domain basis vector is one of the 2L spatial domain basis vectors.

In an embodiment, the determining multiple effective channel information based on the beamformed CSI-RSs, or the beamformed CSI-RSs and the frequency domain basis vector indication information, includes:
  determining 2L or more pieces of first effective channel information based on the first CSI-RSs beamformed by 2L or more first beams;
  determining M−1 frequency domain basis vectors and M−1 or more pieces of first effective channel information based on the first CSI-RSs beamformed by M−1 or more first beams;
  determining (2L−1)(M−1) or more pieces of second effective channel information based on 2L−1 or more pieces of first effective channel information corresponding to preset beamformed CSI-RSs among 2L or more pieces of first effective channel information and M−1 frequency domain basis vectors; and
  taking 2L+M−1 or more pieces of first effective channel information and (2L−1) (M−1) or more pieces of second effective channel information as the effective channel information.

In an embodiment, the determining (2L−1) (M−1) or more pieces of second effective channel information based on 2L−1 or more pieces of first effective channel information corresponding to preset beamformed CSI-RSs among 2L or more pieces of first effective channel information and M−1 frequency domain basis vectors, includes:

respectively calculating a Hadamard product of each piece of first effective channel information corresponding to 2L−1 or more preset beamformed CSI-RSs and each frequency domain basis vector among M−1 frequency domain basis vectors to obtain (2L−1) (M−1) or more pieces of second effective channel information.

In an embodiment, the receiving beamformed CSI-RSs, or the beamformed CSI-RSs and frequency domain basis vector indication information transmitted by a network side by means of antenna ports, includes:

receiving second beamformed CSI-RSs and frequency domain basis vector indication information transmitted by the network side by means of the antenna ports;

where second beams used in beamforming the second CSI-RSs are determined based on all the spatial domain basis vectors and a part of the frequency domain basis vectors, and the frequency domain basis vector indication information is configured to indicate the other part of the frequency domain basis vectors.

In an embodiment, the number of the spatial domain basis vectors is 2L, the number of the frequency domain basis vectors is M, and both L and M are positive integers;

the number of the second beams is not less than 2LM', where M' is a positive integer less than M;

2LM' or more second beams are determined based on 2L spatial domain basis vectors and any M' frequency domain basis vectors; any M' frequency domain basis vector includes a first frequency domain basis vector, and all elements of the first frequency domain basis vector are 1;

the frequency domain basis vector indication information includes $$\left\lceil \log_2 \binom{N_3 - 1}{M - M'} \right\rceil$$

bit indication information for indicating M−M' frequency domain basis vectors, where $N_3$ is the number of PMI subbands; or, the frequency domain basis vector indication information includes $\lceil \log_2(\alpha M) \rceil$ bits for indicating starting points of M−M' frequency domain basis vectors, and $$\left\lceil \log_2 \binom{\alpha M - 1}{M - M'} \right\rceil$$

bits indication information for indicating M−M' frequency domain basis vectors; or, the frequency domain basis vector indication information includes $\lceil \log_2(M-1) \rceil$ bits for indicating consecutive M frequency domain basis vectors.

In an embodiment, the determining multiple effective channel information based on the beamformed CSI-RSs, or the beamformed CSI-RSs and the frequency domain basis vector indication information, includes:

determining 2LM' or more pieces of first effective channel information based on second CSI-RSs beamformed by 2LM' or more second beams;

determining M−M' frequency domain basis vectors based on the frequency domain basis vector indication information;

determining 2L(M−M') or more pieces of second effective channel information based on the first effective channel information corresponding to 2L or more second beams determined based on the first frequency domain basis vector among 2LM' or more second beams, and M−M' frequency domain basis vectors; and taking 2LM' or more pieces of first effective channel information and 2L(M−M') or more pieces of second effective channel information as the effective channel information.

In an embodiment, the determining the port indication information and the port combination coefficients for data transmission based on the multiple effective channel information, includes:

performing eigenvalue decomposition on a covariance matrix of the multiple effective channel information to obtain eigenvectors corresponding to the largest eigenvalues, the number of which is that of the downlink transmission layers;

selecting, from eigenvectors corresponding to any downlink transmission layer, non-zero elements with the largest amplitude, the number of which is not greater than a preset number of ports to obtain a port combination coefficient of the any downlink transmission layer; and determining the port indication information for data transmission of the any downlink transmission layer based on the port to which an effective channel corresponding to the port combination coefficient of any downlink transmission layer is applied.

In an embodiment, the selecting, from eigenvectors corresponding to any downlink transmission layer, non-zero elements with the largest amplitude, the number of which is not greater than the preset number of ports, to obtain the port combination coefficient of the any downlink transmission layer, includes:

selecting, from eigenvectors corresponding to any downlink transmission layer, non-zero elements with the largest amplitude, the number of which is not greater than the preset number of ports; and normalizing and quantizing the non-zero elements with the largest amplitude, the number of which is not greater than the preset number of ports, to obtain the port combination coefficient of the any downlink transmission layer.

In an embodiment, the method further includes before receiving the beamformed CSI-RSs, or the beamformed CSI-RSs and frequency domain basis vector indication information transmitted by a network side by means of antenna ports, transmitting sounding reference signals (SRSs) to the network side determining the spatial domain basis vectors and the frequency domain basis vectors corresponding to the uplink channel based on the SRSs at the network side.

In a second aspect, an embodiment of the present application provides a method for feeding back channel state information (CSI), including:

transmitting beamformed channel state information reference signals (CSI-RSs), or the beamformed CSI-RSs and frequency domain basis vector indication information to a terminal by means of antenna ports, where beams used in beamforming is determined based on spatial domain basis vectors or based on the spatial domain basis vectors and frequency domain basis vectors, and the spatial domain basis vector and the frequency domain basis vector are determined based on an uplink channel;

receiving port indication information and port combination coefficients for data transmission fed back by the terminal; where the port indication information and the port combination coefficients are determined by the terminal based on the beamformed CSI-RSs, or the beamformed CSI-RSs and frequency domain basis vector indication information; and determining precoding of the downlink transmission data based on the port indication information and the port combination coefficients.

In an embodiment, the transmitting beamformed CSI-RSs, or the beamformed CSI-RSs and frequency domain basis vector indication information to a terminal by means of antenna ports, includes:

transmitting first beamformed CSI-RSs to the terminal by means of the antenna ports;

where first beams used in beamforming the first CSI-RSs are determined based on all spatial domain basis vectors and all frequency domain basis vectors.

In an embodiment, the number of the spatial domain basis vectors is 2L, the number of the frequency domain basis vectors is M, and both L and M are positive integers;

the number of the first beams is not less than 2L+M−1;

2L or more first beams are determined based on 2L spatial domain basis vectors, and M−1 or more first beams are determined based on a preset spatial domain basis vector and M−1 frequency domain basis vectors; the preset spatial domain basis vector is one of the 2L spatial domain basis vectors.

In an embodiment, the transmitting the beamformed CSI-RSs, or the beamformed CSI-RSs and frequency domain basis vector indication information to a terminal by means of antenna ports, includes:

transmitting second beamformed CSI-RSs and frequency domain basis vector indication information to the terminal by means of the antenna ports;

where second beams used in beamforming the second CSI-RSs are determined based on all the spatial domain basis vectors and a part of the frequency domain basis vectors, and the frequency domain basis vector indication information is configured to indicate the other part of the frequency domain basis vectors.

In an embodiment, the number of the spatial domain basis vectors is 2L, the number of the frequency domain basis vectors is M, and both L and M are positive integers;

the number of the second beams is not less than 2LM', where M' is a positive integer less than M;

2LM' or more second beams are determined based on 2L spatial domain basis vectors and any M' frequency domain basis vectors; the any M' frequency domain basis vector includes a first frequency domain basis vector, and all the elements of the first frequency domain basis vector are 1;

the frequency domain basis vector indication information includes $$\left\lceil \log_2\binom{N_3-1}{M-M'} \right\rceil$$

bits indication information for indicating M−M' frequency domain basis vectors, and $N_3$ is the number of PMI subbands; or, the frequency domain basis vector indication information includes $\lceil \log_2(\alpha M) \rceil$ bits for indicating starting points of M−M' frequency domain basis vectors, and $$\left\lceil \log_2\binom{\alpha M-1}{M-M'} \right\rceil$$

bits indication information for indicating M−M' frequency domain basis vectors; or, the frequency domain basis vector indication information includes $\lceil \log_e(M-1) \rceil$ bits for indicating consecutive M frequency domain basis vectors.

In an embodiment, the beams used in beamforming are obtained by calculating a Kronecker product of the spatial domain basis vectors and the frequency domain basis vectors.

In an embodiment, the method further includes before transmitting the beamformed CSI-RSs, or the beamformed CSI-RSs and the frequency domain basis vector indication information to the terminal by means of the antenna ports, receiving sounding reference signals (SRSs) transmitted by the terminal; and determining the spatial domain basis vectors and the frequency domain basis vectors corresponding to the uplink channel based on the SRSs.

In a third aspect, an embodiment of the present application provides a device for feeding back channel state information (CSI), including:

a receiving device, configured to receive beamformed channel state information reference signals (CSI-RSs), or the beamformed CSI-RS and frequency domain basis vector indication information transmitted by a network side by means of antenna ports; where beams used in the beamforming are determined based on spatial domain basis vectors, or based on the spatial domain basis vectors and frequency domain basis vectors, and the spatial domain basis vectors and the frequency domain basis vectors are determined based on the uplink channel;

a port determining device, configured to determine port indication information and port combination coefficients for data transmission based on the beamformed CSI-RSs, or the beamformed CSI-RSs and the frequency domain basis vector indication information; and a feedback device, configured to feed back the port indication information and the port combination coefficients to a network side for the network side for determining precoding of downlink transmission data based on the port indication information and the port combination coefficients.

In a fourth aspect, an embodiment of the present application provides a device for feeding back channel state information (CSI), including:

a transmitting device, configured to transmit beamformed channel state information reference signals (CSI-RSs), or the beamformed CSI-RSs and the frequency domain basis vector indication information to a terminal by means of antenna ports; where beams used in beamforming are determined based on spatial domain basis vectors or based on the spatial domain basis vectors and frequency domain basis vectors, and the spatial domain basis vectors and the frequency domain basis vectors are determined based on an uplink channel;

a port receiving device, configured to receive port indication information and port combination coefficients for data transmission fed back by the terminal; the port indication information and the port combination coefficients are determined by the terminal based on the beamformed CSI-RSs, or the beamformed CSI-RSs and frequency domain basis vector indication information;

a precoding device, configured to determine precoding of the downlink transmission data based on the port indication information and the port combination coefficients.

In a fifth aspect, an embodiment of the present application provides a terminal, including a memory, a processor, and a program stored in the memory and executable on the processor, where the program, when being executed on the processor, causes the processor to implement the following steps:

receiving beamformed channel state information reference signals (CSI-RSs), or the beamformed CSI-RS and frequency domain basis vector indication information transmitted by a network side by means of antenna ports; where beams used in beamforming are determined based on spatial domain basis vectors, or based on the spatial domain basis vectors and frequency domain basis vectors, and the spatial domain basis vectors and the frequency domain basis vectors are determined based on an uplink channel;

determining port indication information and port combination coefficients for data transmission based on the beamformed CSI-RSs, or the beamformed CSI-RSs and the frequency domain basis vector indication information;

feeding back the port indication information and the port combination coefficients to the network side for determining precoding of downlink transmission data based on the port indication information and the port combination coefficients at the network side.

In a sixth aspect, an embodiment of the present application provides a network side, comprising a memory, a processor, and a program stored in the memory and executable on the processor, where the program, when being executed on the processor, causes the processor to implement the following steps:

transmitting beamformed CSI-RSs, or beamformed CSI-RSs and frequency domain basis vector indication information to a terminal by means of antenna ports; where beams used in beamforming are determined based on spatial domain basis vectors or based on the spatial domain basis vectors and frequency domain basis vectors, and the spatial domain basis vectors and the frequency domain basis vectors are determined based on an uplink channel;

receiving port indication information and port combination coefficients for data transmission fed back by the terminal; the port indication information and the port combination coefficients are determined by the terminal based on the beamformed CSI-RSs, or the beamformed CSI-RSs and frequency domain basis vector indication information; and determining precoding of downlink transmission data based on the port indication information and the port combination coefficients.

In a seventh aspect, an embodiment of the present application provides a non-transitory computer-readable storage medium having stored thereon a computer program, where the computer program, when being executed by a processor, causes the processor to implement steps of methods according to the first and second aspects.

By the method and device for feeding back channel state information, the terminal, the network side, and the storage medium provided by the embodiments of the present application, the reciprocity of angle information and delay information of uplink and downlink channels is applied, thus the terminal can determine the port indication information and port combination coefficients for data transmission based on the beamformed CSI-RSs, or the beamformed CSI-RSs and the frequency domain basis vector indication information without additionally calculating the delay information of the downlink channel, which decreases the computational complexity of the terminal, reduces the feedback overhead of the terminal and further improves system performance.

BRIEF DESCRIPTION OF THE DRAWINGS

In order to more clearly illustrate the solutions of the embodiments of the present application or in the prior art, the following will briefly introduce the accompanying drawings used in the description of the embodiments or the prior art. The accompanying drawings in the following description are some embodiments of the present application.

DETAILED DESCRIPTION

Figure 1:
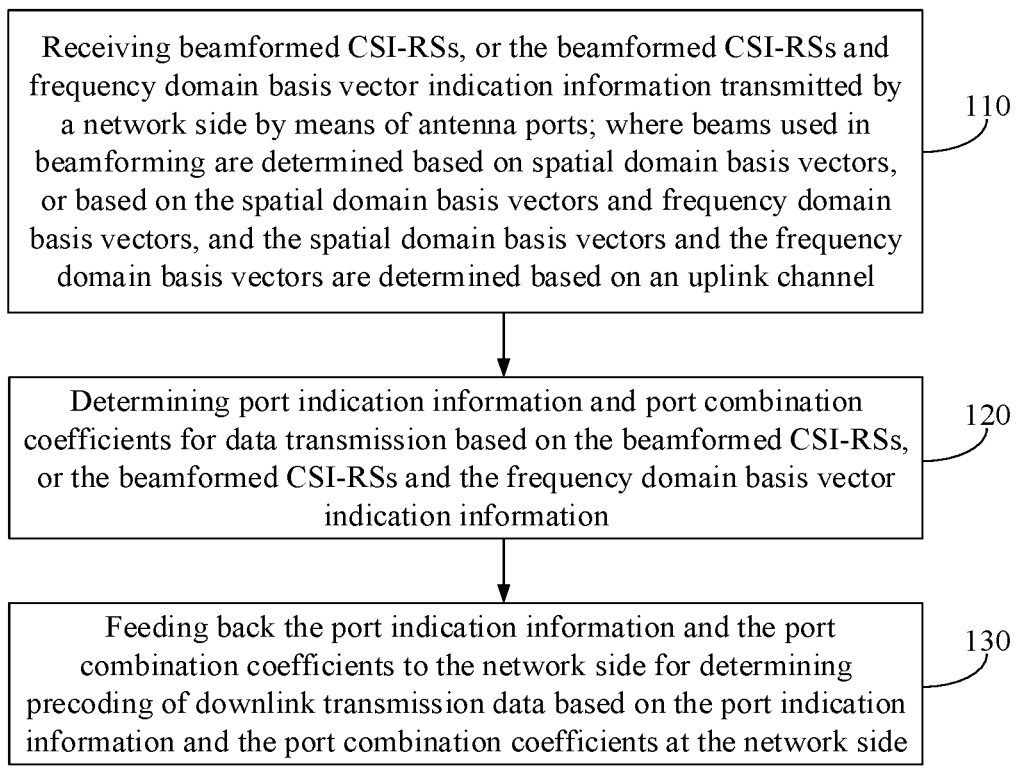
FIG. 1 is a schematic flowchart of a method for feeding back channel state information according to an embodiment of the present application.

The embodiments of the present application are clearly and completely described below in conjunction with the accompanying drawings in the embodiments of the present application. The embodiments described are part of the embodiments of the present application, rather than all embodiments.

With the development and changes of mobile communication service requirements, a new wireless communication system 5th Generation New RAT (5G NR) came into being. In Rel-16, an enhanced Type II port selection codebook is defined, which can support Rank=1-4. It implements port selection through $W_1$, and achieves linear mergence between ports using the same method as the Rel-16 Type II codebook. Each channel state information reference signal (CSI-RS) port undergoes beamforming, and its beamforming can be determined by reciprocity of uplink and downlink channel angle information. The $W_1$ representation of the port selection codebook is as follows:

$$W_1 = \begin{bmatrix} E_{\frac{X}{2} \times L} & 0 \\ 0 & E_{\frac{X}{2} \times L} \end{bmatrix},$$

where X is the number of CSI-RS ports, and it has the same value as the antenna configuration supported by the enhanced Type II codebook in Rel-16. The parameter L∈{2,4} is configurable. Each port selection block is represented as:

$$E_{\frac{X}{2} \times L} = \left[ e_{mod(md, \frac{X}{2})}^{(\frac{X}{2})} \quad e_{mod(md+1, \frac{X}{2})}^{(\frac{X}{2})} \quad \cdots \quad e_{mod(md+L-1, \frac{X}{2})}^{(\frac{X}{2})} \right],$$

where $e_i^{(\frac{X}{2})}$ represents a vector having a length of $$\frac{X}{2},$$

the i-th element of which is 1, and the remaining elements of which are 0. The parameter m is used to select L consecutive ports, and the value of m is $$m \in \left\{ 0, 1, \cdots, \left\lceil \frac{X}{2d} \right\rceil - 1 \right\},$$

using wideband feedback. The parameter d∈{1,2,3,4} is configurable and needs to satisfy the condition d≤L, which is used to adjust the sampling interval of each L beam and affects the feedback overhead; the above-mentioned manner is equivalent to dividing X/2 ports into X/2d groups, and reducing the feedback overhead of indicator m. In addition, consideration needs to be given to avoid selecting beams with similar directions for linear emergence regarding the selection of d.

For the selected L ports, the Type II codebook structure of Rel-16 is used to calculate and obtain the port selection codebook. Taking Rank=1 as an example, the Type II codebook structure of Rel-16 can be written as:

$$W = W_1 \tilde{W}_2 W_f^H,$$

where W is a X×N₃ precoding matrix, N₃ represents the number of precoding matrix indicator (PMI) subbands. $W_f$ represents frequency domain basis vectors used to compress the frequency domain combination coefficients, which consists of M discrete Fourier transform (DFT) vectors, and $\tilde{W}_2$ represents the linear combination coefficients obtained by compressing the N₃ PMI subband coefficients with $W_f$.

Currently, for the enhanced port selection codebook in Rel-16, the terminal needs to perform SVD calculation on each PMI subband, and the computational complexity for the terminal is high. In addition, the terminal needs to calculate the downlink delay information and report the downlink delay information to the network side, which brings larger feedback overhead. Therefore, an embodiment of the present application provides a method for feeding back channel state information which can solve the above problems.

FIG. 1 is a schematic flowchart of a method for feeding back channel state information according to an embodiment of the present application. As shown in FIG. 1, the method may be performed by a terminal, and the method includes:

step 110: receiving beamformed CSI-RSs, or the beamformed CSI-RSs and frequency domain basis vector indication information transmitted by a network side by means of antenna ports; where beams used in beamforming are determined based on spatial domain basis vectors, or based on the spatial domain basis vectors and frequency domain basis vectors, and the spatial domain basis vectors and the frequency domain basis vectors are determined based on an uplink channel.

Specifically, the network side pre-estimates and obtains the uplink channel, and notifies the terminal of the information of the uplink channel by transmitting the beamformed CSI-RSs, or the beamformed CSI-RSs and the frequency domain basis vector indication information to the terminal.

Here, if the network side only transmits the beamformed CSI-RSs to the terminal, the beams used in beamforming can be determined based on the spatial domain basis vectors and the frequency domain basis vectors corresponding to the uplink channel; if the network side transmits not only the beamformed CSI-RSs, but also the frequency domain basis vector indication information to the terminal, the beams used in beamforming can be determined only based on the spatial domain basis vector corresponding to the uplink channel, or based on the spatial domain basis vectors and the frequency domain basis vectors corresponding to the uplink channel, and the frequency domain basis vector indication information is used to indicate the frequency domain basis vector which is not used to determine the beams used in beamforming. The frequency domain basis vector indication information may be transmitted to the terminal by any one of radio resource control (RRC), media access control-control element (MAC-CE) and downlink control information (DCI) signaling.

Further, the beams used in beamforming may be determined based on the angle information of the uplink channel, or the angle information and delay information of the uplink channel; the angle information is determined based on the spatial domain basis vector, and the delay information is determined based on the frequency domain basis vector.

Correspondingly, the network side pre-estimates and obtains the angle information and delay information of the uplink channel, and transmits the beamformed CSI-RSs, or the beamformed CSI-RSs and the frequency domain basis vector indication information to the terminal, and the terminal can be informed the angle information and delay information of the uplink channel.

Here, if the network side only transmits the beamformed CSI-RS to the terminal, the beams used in beamforming are determined based on the angle information and delay information of the uplink channel; if the network side transmits not only the beamformed CSI-RS, but also the frequency domain basis vector indication information to the terminal, the beams used in beamforming can be determined only based on the angle information of the uplink channel, or based on the angle information and delay information of the uplink channel, and the frequency domain basis vector indication information is used to indicate the frequency domain basis vector which is not used to determine the beams used in beamforming.

It should be noted that the spatial domain basis vector used for determining the angle information of the uplink channel can be expressed as eigenvector, DFT, discrete cosine transform (DCT), polynomial coefficient, Karhunen-Loeve transform (KLT) and the like. The frequency domain basis vector of the delay information can be expressed as DFT, DCT, polynomial coefficient and the like. The specific number of spatial domain basis vectors and the specific number of frequency domain basis vectors may be either pre-agreed between the network side and the terminal or configured by the network side to the terminal through signaling, which is not limited in this embodiment of the present application.

Step 120: determining port indication information and port combination coefficients for data transmission based on the beamformed CSI-RSs, or the beamformed CSI-RSs and the frequency domain basis vector indication information.

Specifically, due to the reciprocity of the angle information and the delay information of the uplink and downlink channels, namely the equivalence between uplink and downlink channels in terms of the angle information and the delay information, the uplink and downlink channels correspond to the same spatial domain basis vectors and frequency domain basis vectors. After receiving the beamformed CSI-RSs, or the beamformed CSI-RSs and the frequency domain basis vector indication information, instead of calculating the angle information and delay information of the downlink channel, the terminal can obtain the spatial domain basis vector and frequency domain basis vector that can be used to determine the angle information and delay information of the downlink channel directly using the beamformed CSI-RSs, or the beamformed CSI-RSs and the frequency domain basis vector indication information, and then select the ports for data transmission, and generate port indication information and port combination coefficients corresponding to each port indicated by the port indication information.

Step 130: feeding back the port indication information and port combination coefficients to the network side for determining precoding of downlink transmission data based on the port indication information and the port combination coefficients at the network side.

By the method provided by the embodiment of the present application, the reciprocity of angle information and delay information of uplink and downlink channels is applied, and the terminal can determine the port indication information and port combination coefficients for data transmission based on the beamformed CSI-RSs, or the beamformed CSI-RSs and the frequency domain basis vector indication information without additionally calculating the delay information of the downlink channel, which decreases the computational complexity of the terminal, reduces the feedback overhead of the terminal and further improves system performance.

Based on the above embodiment, step 120 includes:

Step 121: determining multiple effective channel information based on the beamformed CSI-RSs, or the beamformed CSI-RSs and the frequency domain basis vector indication information.

Specifically, after receiving the beamformed CSI-RSs, the terminal can estimate the effective channel information of a corresponding port based on the beamformed CSI-RSs. On this basis, the terminal can also obtain corresponding effective channel information when beams generated based on each spatial domain basis vector and each frequency domain basis vector are transmitted according to the frequency domain basis vector included in the frequency domain basis vector indication information, in combination with the estimated effective channel information. Here, the number of multiple effective channel information is not less than a product of the number of spatial domain basis vectors and the number of frequency domain basis vectors.

Step 122: determining the port indication information and the port combination coefficients for data transmission based on the multiple effective channel information.

Specifically, after obtaining the multiple effective channel information, the terminal can select effective channel information for data transmission from the multiple effective channel information, and generate port indication information and port combination coefficients based on the port used corresponding to the selected effective channel information, and report the port indication information and port combination coefficients to the network side for the network side to calculate the downlink precoding. Here, the number of ports selected by the terminal may be configured by the network side, reported by the terminal, or pre-agreed between the network side and the terminal.

Based on any of the above embodiments, step 110 includes: receiving first beamformed CSI-RSs transmitted by the network side by means of the antenna ports; where first beams used in beamforming the first CSI-RSs are determined based on all spatial domain basis vectors and all frequency domain basis vectors.

Specifically, in order to ensure downlink signaling or CSI-RS resource overhead, the network side can implicitly transmit the frequency domain basis vector to the terminal by transmitting the first beamformed CSI-RSs to the terminal.

The first CSI-RSs are CSI-RSs when the network side implicitly transmits the frequency domain basis vectors, the first beams are beams used in beamforming the first CSI-RSs, and the beams corresponding to all the first CSI-RSs need to be calculated based on all the spatial domain basis vectors used to determine the angle information of the uplink channel and all the frequency domain basis vectors used to determine the delay information of the uplink channel. Therefore, on the terminal side, all the spatial domain basis vectors and all the frequency domain basis vectors can be obtained only by means of each first CSI-RS.

Based on any of the above embodiments, in the case where the network side transmits the first beamformed CSI-RSs to the terminal, the number of the spatial domain basis vectors is 2L, the number of the frequency domain basis vectors is M, and both L and M are positive integers; the number of the first beams is not less than 2L+M−1; 2L or more first beams are determined based on 2L spatial domain basis vectors, and M−1 or more first beams are determined based on preset spatial domain basis vector and M−1 frequency domain basis vectors; the preset spatial domain basis vector is one of the 2L spatial domain basis vectors.

Here, both L and M are codebook parameters, and L and M may be configured by the network side to the terminal through signaling or may be pre-agreed between the network side and the terminal. Among the M frequency domain basis vectors, there is a frequency domain basis vector with all elements being 1, that is, the first frequency domain basis vector.

Among 2L+M−1 or more first beams, the 2L or more first beams are obtained by calculating the Kronecker product of the 2L spatial domain basis vectors and the first frequency domain basis vector, respectively. Since all elements of the first frequency domain basis vector are 1, the above 2L or more first beams may also be recorded as being determined based on the 2L spatial domain basis vectors respectively.

M−1 or more first beams are obtained by calculating the Kronecker product of a preset spatial domain basis vector and the M−1 frequency domain basis vectors, respectively. Here, the M−1 frequency domain basis vectors are frequency domain basis vectors other than the first frequency domain basis vector among the M frequency domain basis vectors. The preset spatial domain basis vector is a spatial domain basis vector selected in advance from the 2L spatial domain basis vectors, and the preset spatial domain basis vector may be pre-agreed between the network side and the terminal, or may be configured by the network side to the terminal through signaling, which is not limited in this embodiment of the present application.

By the method provided by the embodiment of the present application, transmission of the frequency domain basis vectors is realized through first CSI-RSs beamformed by 2L+M−1 first beams, which saves the downlink signaling overhead while reducing the computational complexity of the terminal.

Based on any of the above embodiments, in the case where the network side transmits the first beamformed CSI-RS to the terminal, step 121 includes:

step 1211: determining 2L or more first multiple effective channel information based on the first CSI-RSs beamformed by 2L or more first beams.

Step 1212: determining M−1 frequency domain basis vectors and M−1 or more pieces of first effective channel information based on the first CSI-RSs beamformed by M−1 or more first beams.

Specifically, based on any first CSI-RS, the effective channel information corresponding to the first CSI-RS can be obtained. For the convenience of distinction, the effective channel information directly determined based on the CSI-RS is recorded as the first effective channel information here. The number of the pieces of first effective channel information is consistent with the number of the first CSI-RSs received by the terminal and thus the number of the pieces of first effective channel information is 2L+M−1 or more.

Step 1213: determining (2L−1) (M−1) or more pieces of second effective channel information based on 2L−1 or more pieces of first effective channel information corresponding to preset beamformed CSI-RSs among 2L or more pieces of first effective channel information and M−1 frequency domain basis vectors.

Specifically, among the 2L or more pieces of first effective channel information, there are 2L−1 pieces of first effective channel information, and the corresponding CSI-RSs are preset beamformed CSI-RSs. Here, the preset beamforming CSI-RSs may be pre-agreed between the network side and the terminal or may be configured by the network side to the terminal through signaling.

(2L−1) (M−1) or more pieces of second effective channel information are obtained by calculating the Hadamard product of the first effective channel information corresponding to the above 2L−1 preset beamformed CSI-RSs and M−1 frequency domain basis vectors, respectively. Here, the effective channel information obtained based on the first effective channel information and the frequency domain basis vector is recorded as the second effective channel information.

Step 1214: taking 2L+M−1 or more pieces of first effective channel information and (2L−1) (M−1) or more pieces of second effective channel information as the effective channel information.

Specifically, 2L+M−1 or more pieces of first effective channel information determined directly based on CSI-RSs and (2L−1) (M−1) or more pieces of second effective channel information obtained based on first effective channel information and frequency domain basis vector are taken as the effective channel information.

Based on any of the above embodiments, step 1213 includes: respectively calculating a Hadamard product of each piece of first effective channel information corresponding to 2L−1 or more preset beamformed CSI-RSs and each frequency domain basis vector among M−1 frequency domain basis vectors, to obtain (2L−1) (M−1) or more pieces of second effective channel information.

Specifically, the Hadamard product of each piece of first effective channel information corresponding to 2L−1 or more preset beamformed CSI-RSs and each frequency domain basis vector among the M−1 frequency domain basis vectors is calculated, and the Hadamard product is taken as the second effective channel information corresponding to the each piece of first effective channel information corresponding to 2L−1 or more preset beamformed CSI-RSs and each frequency domain basis vector among the M−1 frequency domain basis vectors. Each piece of first effective channel information corresponding to 2L−1 or more preset beamformed CSI-RSs and each frequency domain basis vector among the M−1 frequency domain basis vectors are combined in pairs to obtain (2L−1) (M−1) or more pieces of second effective channel information.

Based on any of the above embodiments, it is assumed that the codebook parameters configured for the terminal by the network side are L=2, M=4. The terminal uses one antenna to transmit uplink signals, $N_r$ antennas to receive downlink signals, and downlink transmits a layer of data. A dual-polarized two-dimensional planar antenna array is configured on the network side, and the antenna array is mapped into $2N_1N_2$ transmitting antenna ports, where $N_1$ and $N_2$ represent the number of antenna ports in the horizontal and vertical directions respectively, the number of PMI subbands is $N_3$, and each subband has a size of 1 PRB. The network side transmits a layer of data to the terminal.

The network side transmits the first beamformed CSI-RSs to the terminal through 7 (equal to 2L+M−1) ports, the beams of the first 2L ports are obtained by calculating Kronecker product of 2L different spatial domain basis vectors and the first frequency domain basis vector (i.e. the frequency domain basis vectors having length of $N_3$ and with all elements being 1), that is, the kth port beam $b_k = v_l \otimes 1_{N_3} \in \mathbb{C}^{N_1N_2N_3 \times 1}$, where $v_l$ represents the lth spatial domain basis vector. The effective channel of the lth port estimated by the terminal is:

$$\tilde{H}_l = \begin{bmatrix} H_0 v_l \\ H_1 v_l \\ \vdots \\ H_{N_3-1} v_l \end{bmatrix}, l \in \{0, \ldots, 2L-1\},$$

where $H_n$ represents the channel of the nth subband.

Assuming that the beams of the remaining M−1 ports predefined by the network side and the terminal are obtained by calculating Kronecker product of the spatial base vector (i.e. $v_0$) used in the first port and the M−1 frequency domain basis vectors other than the first frequency basis vector selected by the network side, that is, the kth port beam $b_k = v_0 \otimes f_m \in \mathbb{C}^{N_1N_2N_3 \times 1}$, where $f_m$ represents the mth frequency domain basis vector, then the effective channel of the kth port estimated by the terminal is:

$$\tilde{H}_k = \begin{bmatrix} H_0 v_0 \\ H_1 v_0 e^{-j2\pi \frac{k_m}{N_3}} \\ \vdots \\ H_{N_3-1} v_0 e^{-j2\pi \frac{(N_3-1)k_m}{N_3}} \end{bmatrix}$$

Where $k_m$ represents an index corresponding to the mth frequency domain basis vector among the $N_3$ basis vectors.

Therefore, the mth frequency domain basis vector used by the network side can be determined according to $$\tilde{H}_0 = \begin{bmatrix} H_0 v_0 \\ H_1 v_0 \\ \vdots \\ H_{N_3-1} v_0 \end{bmatrix}$$

and $\tilde{H}_k$.

Similarly, the terminal can determine M−1 or more frequency domain basis vectors used by the network side.

Finally, the terminal calculates the remaining (2L−1)(M−1)=9 multiple effective channel information through $\tilde{H}_k$ according to $\tilde{H}_l$ and the determined M−1 frequency domain basis vectors, to obtain K=2LM=16 multiple effective channel information, which are recorded as $\tilde{H}_{\textit{eff}}=[\tilde{H}_0 \ldots \tilde{H}_{15}] \in \mathbb{C}^{N_r N_3 \times K}$.

Based on any of the foregoing embodiments, step 110 includes: receiving second beamformed CSI-RSs and frequency domain basis vector indication information transmitted by the network side by means of the antenna ports; where second beams used in beamforming the second CSI-RSs are determined based on all the spatial domain basis vectors and a part of the frequency domain basis vectors, and the frequency domain basis vector indication information is configured to indicate the other part of the frequency domain basis vectors.

Specifically, the network side may also explicitly transmit the frequency domain basis vectors to the terminal by transmitting the second beamformed CSI-RSs and the frequency domain basis vector indication information to the terminal.

The second CSI-RSs are CSI-RSs when the network side explicitly transmits the frequency domain basis vector, and the second beams are beams used in beamforming the second CSI-RSs. The frequency domain basis vectors used to determine the delay information of the uplink channel are divided into two parts, one of which is used to cooperate with all the spatial domain basis vectors to determine the second beams corresponding to the second CSI-RSs which is implicitly transmitted to the terminal through beamforming, and the other part of which constitutes the frequency domain basis vector indication information which is explicitly transmitted to the terminal. Therefore, on the terminal side, all the spatial domain basis vectors and a part of the frequency domain basis vectors can be obtained by each second CSI-RS, and the other part of the frequency domain basis vectors can be obtained by the frequency domain basis vector indication information, and all the spatial domain basis vectors and all the frequency domain basis vectors are obtained.

It should be noted that when the frequency domain basis vectors are divided, the frequency domain basis vectors for determining the second beam may be one or more, and the number of the frequency domain basis vectors may be pre-agreed between the network side and the terminal or may be configured by the network side to the terminal through signaling.

Based on any of the above embodiments, in the case where the network side transmits the second beamformed CSI-RSs and frequency domain basis vector indication information to the terminal, the number of the spatial domain basis vectors is 2L, the number of the frequency domain basis vectors is M, and both L and M are positive integers; the number of the second beams is not less than 2LM', where M' is a positive integer less than M; 2LM' or more second beams are determined based on 2L spatial domain basis vectors and any M' frequency domain basis vectors; the any M' frequency domain basis vectors include a first frequency domain basis vector, and all the elements of the first frequency domain basis vector are 1.

Here, L, M, and M' are all codebook parameters, and L, M, and M' may be configured by the network side to the terminal through signaling or may be pre-agreed between the network side and the terminal. The M frequency domain basis vectors are divided into two parts, that is, M' frequency domain basis vectors and M−M' frequency domain basis vectors.

2LM' or more second beams are obtained by calculating the Kronecker product of the 2L spatial domain basis vectors and the M' frequency domain basis vectors respectively. Since there is a first frequency domain basis vector with all elements being 1 among the M' frequency domain basis vectors, 2L or more first beams among the above 2LM' or more second beams can also be recorded as being determined based on 2L spatial domain basis vectors respectively.

Based on any of the above embodiments, in the case where the network side transmits the second beamformed CSI-RSs and frequency domain basis vector indication information to the terminal, the frequency domain basis vector indication information includes $$\left\lceil \log_2 \binom{N_3 - 1}{M - M'} \right\rceil$$

bits indication information for indicating M−M' frequency domain basis vectors, where $N_3$ is the number of PMI subbands; or, the frequency domain basis vector indication information includes $\lceil \log_2(\alpha M) \rceil$ bits for indicating starting points of M−M' frequency domain basis vectors, and $$\left\lceil \log_2 \binom{\alpha M - 1}{M - M'} \right\rceil$$

bits indication information for indicating M−M' frequency domain basis vectors; or, the frequency domain basis vector indication information includes $\lceil \log_2(M-1) \rceil$ bit for indicating consecutive M frequency domain basis vectors.

Based on any of the above embodiments, in the case where the network side transmits the second beamformed CSI-RSs and frequency domain basis vector indication information to the terminal, step 121 includes:

determining 2LM' or more pieces of first effective channel information based on the second CSI-RSs beamformed by 2LM' or more second beams; determining M−M' frequency domain basis vectors based on the frequency domain basis vector indication information; determining 2L(M−M') or more pieces of second effective channel information based on the first effective channel information corresponding to 2L or more second beams determined based on the first frequency domain basis vector among 2LM' or more second beams, and M−M' frequency domain basis vectors; and taking 2LM' or more pieces of first effective channel information and 2L(M−M') or more pieces of second effective channel information as the effective channel information.

Specifically, based on any second CSI-RS, the effective channel information corresponding to the second CSI-RSs can be obtained. For the convenience of distinction, the effective channel information directly determined based on the CSI-RSs is recorded as the first effective channel here. The number of the pieces of first effective channel information is consistent with the number of the second CSI-RSs received by the terminal, and thus the number of the pieces of first effective channel information is 2LM' or more.

Since 2L or more second beams among the 2LM' or more second beams are determined based on 2L spatial domain basis vectors and a first frequency domain basis vector with all elements being 1, the second CSI-RSs beamformed by 2L or more second beams determined based on the first frequency domain basis vector may be obtained from the second CSI-RSs beamformed by 2LM' or more second beams, and then the first effective channel information corresponding to the 2L or more second beams determined based on the first frequency domain basis vector is determined, and the Hadamard product of the first effective channel information corresponding to the 2L or more second beams and M−M' frequency domain basis vectors is calculated, and obtaining 2L(M−M') or more pieces of second effective channel information. Here, the effective channel information obtained based on the first effective channel information and the remaining frequency domain basis vectors is recorded as the second effective channel information.

2LM' or more pieces of first effective channel information determined directly based on CSI-RSs and 2L(M−M') or more pieces of second effective channel information obtained based on the first effective channel information and the remaining frequency domain basis vectors are taken as the effective channel information.

It should be noted that when M'=1, there are 2L or more second beams, which are determined based on 2L or more spatial domain basis vectors and a first frequency domain basis vector with all elements being 1. After 2L or more pieces of first effective channel information are determined based on the second CSI-RSs beamformed by 2L or more second beams, the Hadamard product of the 2L or more pieces of first effective channel information here and M−1 frequency domain basis vectors included in the frequency domain basis vector information can be directly calculated respectively to obtain 2L(M−1) or more pieces of second effective channel information.

Based on any of the above embodiments, it is assumed that the codebook parameters configured for the terminal by the network side are L=2, M=4, α=2. The number $N_3$ of PMI subbands is 13. The network side transmits a layer of data to the terminal.

The network side transmits the second beamformed CSI-RSs through 2L=4 ports, where the first L=2 ports transmit the second CSI-RSs by using the antenna in the first polarization direction, and the beam used by each port is $b_{0,l}=v_l \otimes 1_{N_3} \in \mathbb{C}^{N_1 N_2 N_3 \times 1}$ l=0, ..., L−1, the last L=2 ports transmit the second CSI-RSs by using the antenna in the second polarization direction, and the beam used by each port is $b_{1,l}=v_l \otimes 1_{N_3} \in \mathbb{C}^{N_1 N_2 N_3 \times 1}$, l=0, ..., L−1.

The network side transmits $$\left\lceil \log_2 \binom{N_3-1}{M-1} \right\rceil = \left\lceil \log_2 \binom{12}{3} \right\rceil = 8$$

bits indication information for indicating the remaining M−1 frequency domain basis vectors. Alternatively, the network side transmits $\lceil \log_2(\alpha M) \rceil = \lceil \log_2(8) \rceil = 3$ bits for indicating the starting points $M_{init}$ of αM continuous frequency domain basis vectors and $$\left\lceil \log_2 \binom{\alpha M - 1}{M - 1} \right\rceil = \left\lceil \log_2 \binom{7}{3} \right\rceil = 6$$

bits for indicating the remaining M−1 frequency domain basis vectors.

The terminal determines the remaining M−1 frequency domain basis vectors selected by the network side according to the frequency domain basis vector indication information transmitted by the network side. The terminal then estimates that the effective channel of each port is $\tilde{H}_{p,l,0}$, p=0, 1, l=0, L−1 according to the received second beamformed CSI-RSs on the 2L ports. The 2L ports can be predefined by the network side and the terminal. The effective channel estimated through the l-th port in the p-polarization direction is expressed as:

$$\tilde{H}_{p,l,0} = \begin{bmatrix} H_{p,0} v_l \\ H_{p,1} v_l \\ \vdots \\ H_{p,N_3-1} v_l \end{bmatrix},$$

where $H_{p,1}$ represents the channel of the nth subband in the p-polarization direction. Then, 2L(M−1) multiple effective channel information can be calculated according to the frequency domain basis vector indication information including M−1 frequency domain basis vectors transmitted by the network side. If the index of the mth frequency domain basis vector on which phase rotation is performed is $k_m$, the beam generated by the lth space basis vector $v_l$ and the mth frequency domain basis vector $f_m$ in the p-polarization direction is $b_{p,k}=v_l \otimes f_m$, when the beam is used for transmission, its corresponding effective channel is $$H_{p,k} = \begin{bmatrix} I_{N_r} & 0 & 0 & 0 \\ 0 & e^{-j2\pi \frac{k_m}{N_3}} I_{N_r} & 0 & 0 \\ \cdots & \cdots & \ddots & \cdots \\ 0 & 0 & 0 & e^{-j2\pi \frac{(N_3-1)k_m}{N_3}} I_{N_r} \end{bmatrix} \begin{bmatrix} H_{p,0} v_l \\ H_{p,1} v_l \\ \vdots \\ H_{p,N_3-1} v_l \end{bmatrix}, k = lM + m.$$

Similarly, 2L(M−1) multiple effective channel information can be calculated, and then a total of K=2LM multiple effective channel information can be recorded as $\tilde{H}_{eff}=[\tilde{H}_{0,0} \cdots \tilde{H}_{0,LM-1} \tilde{H}_{1,0} \cdots \tilde{H}_{1,LM-1}] \in \mathbb{C}^{N_r N_3 \times K}$ Based on any of the above embodiments, it is assumed that the codebook parameters configured for the terminal by the network side are L=2, M=4, M'=2, α=2, X=16. The number $N_3$ of PMI subbands is 13. The network side transmits a layer of data to the terminal.

The network side transmits the second beamformed CSI-RS through 2LM'=8 ports.

The network side transmits $$\left\lceil \log_2 \binom{N_3-1}{M-M'} \right\rceil = \left\lceil \log_2 \binom{12}{2} \right\rceil = 7$$

bits indication information for indicating the remaining M–M' frequency domain basis vectors. Alternatively, the network side transmits $\lceil \log_2(\alpha M) \rceil = \lceil \log_2(8) \rceil = 3$ bits determining the starting points $M_{init}$ of $\alpha M$ continuous frequency domain basis vectors and $$\left\lceil \log_2 \binom{\alpha M - 1}{M - M'} \right\rceil = \left\lceil \log_2 \binom{7}{2} \right\rceil = 5$$

bits for indicating the remaining M–M' frequency domain basis vectors.

The terminal first estimates the effective channel information of each port according to the second CSI-RSs received at 8 ports, and then determines 2L ports according to the predefinition at the network side and the terminal, for example adopts the 1st-4th ports of the first frequency domain basis vector.

The terminal can calculate 2L(M–M') multiple effective channel information according to the effective channels estimated by the second CSI-RSs of the predefined 2L ports in combination with M–M' frequency domain basis vectors.

For example, the effective channel of the lth port is $$\tilde{H}_l = \begin{bmatrix} H_0 v_l \\ H_1 v_l \\ \vdots \\ H_{N_3-1} v_l \end{bmatrix},$$

$l \in \{0, \ldots, 2L-1\}$.

The effective channel of the kth ($k \in \{0, 1, \ldots, 2L(M-M')-1\}$) port estimated by the terminal is:

$$\tilde{H}_k = \begin{bmatrix} H_0 v_0 \\ H_1 v_0 e^{-j2\pi \frac{k_m}{N_3}} \\ \vdots \\ H_{N_3-1} v_0 e^{-j2\pi \frac{(N_3-1)k_m}{N_3}} \end{bmatrix},$$

where $k_m$ represents the index corresponding to the mth frequency domain basis vector among the M–M' frequency domain basis vectors in the $N_3$ base vectors. Similarly, the terminal can calculate 2L(M–M') effective channels and then obtain K=2LM=16 multiple effective channel information, which are recorded as $\tilde{H}_{eff} = [\tilde{H}_0 \ldots \tilde{H}_{15}] \in \mathbb{C}^{N_r N_3 \times K}$, according to the channel estimated by the second CSI-RS received in 2LM' ports.

Based on any of the above embodiments, it is assumed that the codebook parameters configured for the terminal by the network side are L=2, M=4, and the number of ports X=16, the corresponding indexes are 0, 1, ..., 15, and port indexes corresponding to a first polarization direction are 0 to 7, and the port indexes corresponding to the second polarization direction are 8 to 15. The network side transmits a layer of data to the terminal.

According to the predefinition at the network side and terminal, the index corresponding to the first port in 2L=4 ports is 0, then the ports whose indexes are 0-3 serve as M consecutive ports, and the ports whose indexes are 0+M=4, 0+X/2=8 and 4+X/2=13 respectively serve as the remaining 2L–1 ports in 2L ports.

Based on any of the above embodiments, step 122 includes:

step 1221: performing eigenvalue decomposition on a covariance matrix of the multiple effective channel information to obtain eigenvectors corresponding to the largest eigenvalues, the number of which is that of the downlink transmission layers.

It is assumed that multiple effective channel information is represented as follows:

$\tilde{H}_{eff} = [\tilde{H}_{0,0} \ldots \tilde{H}_{1,0} \ldots \tilde{H}_{1,LM-1}] \in \mathbb{C}^{N_r N_3 \times K}$, where $\tilde{H}_{p,k}$ is the corresponding effective channel information when the kth beam is transmitted in the p-polarization direction, and the kth beam in the p-polarization direction is a beam generated from the lth spatial domain basis vector $v_l$ and the mth frequency domain basis vector $f_m$. $N_r$ is the number of downlink signal receiving antennas of the terminal, and K=2LM.

Eigenvectors corresponding to the largest eigenvalues, the number of which is that of the downlink transmission layers, can be obtained by performing eigenvalue decomposition to covariance matrix $\tilde{H}_{eff}{}^H \tilde{H}_{eff}$. For example, when the number of downlink transmission layers is 1, the eigenvector $\beta^1 \in \mathbb{C}^{K \times 1}$ corresponding to the largest eigenvalue is taken as the eigenvector corresponding to the downlink transmission layer; when the number of downlink transmission layers is 2, the eigenvector $\beta^1 \in \mathbb{C}^{K \times 1}$t corresponding the largest eigenvalue is taken as the eigenvector corresponding to the first layer, and the eigenvector $\beta^2 \in \mathbb{C}^{K \times 1}$ corresponding to the second largest eigenvalue is taken as the eigenvector corresponding to the second layer.

Step 1222: selecting, from eigenvectors corresponding to any downlink transmission layer, non-zero elements with the largest amplitude, the number of which is not greater than a preset number of ports to obtain the port combination coefficient of the any downlink transmission layer.

Here, the preset number of ports $K_0$ is a preset number of ports used for data transmission of each downlink transmission layer. For any downlink transmission layer, at most $K_0$ non-zero elements with the largest amplitude can be selected from the eigenvectors corresponding to the downlink transmission layer, and the above-mentioned at most $K_0$ non-zero elements with the largest amplitude can be taken as the port combination coefficient of the downlink transmission layer.

Step 1223: determining the port indication information for data transmission of the downlink transmission layer based on the port to which an effective channel corresponding to the port combination coefficient of any downlink transmission layer is applied.

Here, the port indication information for data transmission of any downlink transmission layer can be reported to the network side through a bitmap or a combination coefficient $$\log_2 \binom{K}{K_0}.$$

For example, when the number of downlink transmission layers is 1, the codebook parameters are L=2, M=2, and $K_0$=4, the effective channels corresponding to the ports indicated by the port indication information are $\tilde{H}_{0,0}$, $\tilde{H}_{0,3}$, $\tilde{H}_{1,1}$, $\tilde{H}_{1,2}$, and the port indication information indicated by bitmap is as shown in Table 1.

TABLE 1

| Port indication information of the first layer | |
|---|---|
| 1 | 0 |
| 0 | 1 |
| 0 | 1 |
| 1 | 0 |

In Table 1, 1 represents that the selected port is used for calculating downlink precoding, and 0 represents that the port is not selected.

For another example, when the number of downlink transmission layers is 2, the codebook parameters are L=2, M=2, and $K_0$=4, the effective channels corresponding to the ports indicated by the first layer port indication information are $\tilde{H}_{0,0}$, $\tilde{H}_{0,3}$, $\tilde{H}_{1,1}$, $\tilde{H}_{1,2}$, the effective channels corresponding to the port indicated by the port indication information are $\tilde{H}_{0,1}$, $\tilde{H}_{0,2}$, $\tilde{H}_{1,1}$, $\tilde{H}_{1,3}$, and the port indication information of the first layer and the second layer indicated by bitmap is as shown in Table 2 and Table 3 respectively:

TABLE 2

| Port indication information of the first layer | |
|---|---|
| 1 | 0 |
| 0 | 1 |
| 0 | 1 |
| 1 | 0 |

TABLE 3

| Port indication information of the second layer | |
|---|---|
| 0 | 1 |
| 1 | 0 |
| 0 | 1 |
| 0 | 1 |

In Table 2 and Table 3, 1 represents that the selected port is used for calculating downlink precoding, and 0 represents that the port is not selected.

Based on any of the above embodiments, step 1222 includes: selecting, from eigenvectors corresponding to any downlink transmission layer, non-zero elements with the largest amplitude, the number of which is not greater than the preset number of ports; normalizing and quantizing the non-zero elements with the largest amplitude, the number of which is not greater than the preset number of ports, to obtain the port combination coefficient of any downlink transmission layer.

Based on any of the above embodiments, the method further includes before step 110, transmitting sounding reference signals (SRSs) to the network side and determining the spatial domain basis vectors and the frequency domain basis vectors corresponding to the uplink channel based on the SRSs at the network side.

Specifically, the terminal transmits SRSs to the network side. After receiving the SRSs transmitted by the terminal, the network side can estimate the uplink channel based on the SRSs, and then determine corresponding spatial domain basis vectors and frequency domain basis vectors based on the uplink channel, and determine the beams used in beamforming based on the spatial domain basis vectors or based on the spatial domain basis vectors and the frequency domain basis vectors.

Further, the uplink channel $\hat{H}^{UL}$ can be estimated based on the SRSs, and then the angle information and delay information of the uplink channel can be calculated using $\hat{H}^{UL}$, where the angle information and the delay information can be respectively obtained by performing inverse Fourier transform on $\hat{H}^{UL}$ using a set of spatial domain compression basis vectors and a set of frequency domain basis vectors, that is, the angle information and delay information of the uplink channel can be determined by a set of spatial domain basis vectors and a set of frequency domain basis vectors.

Figure 2:
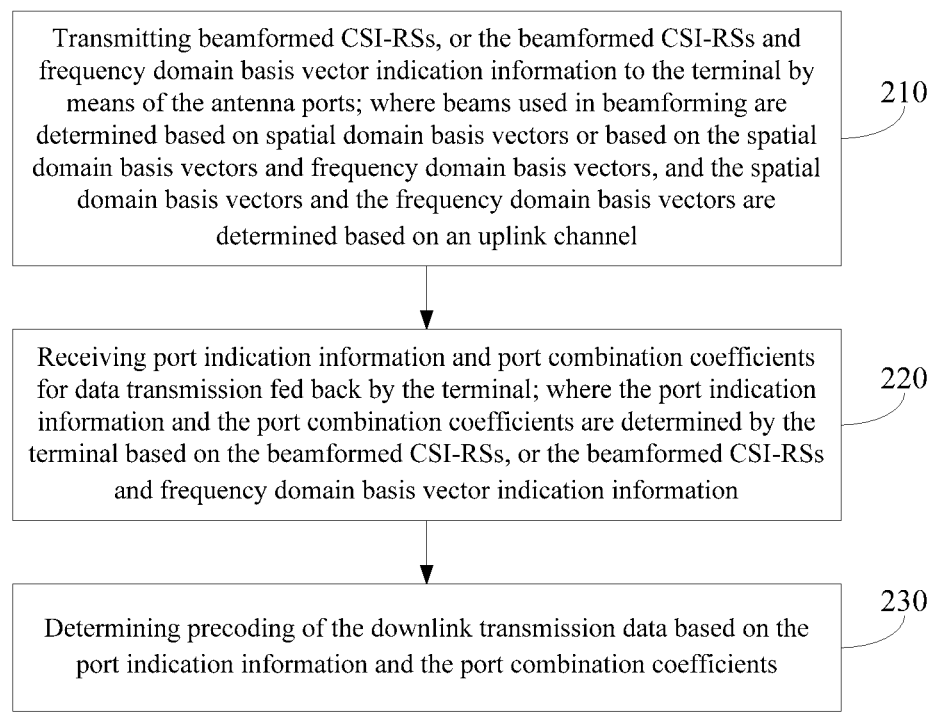
FIG. 2 is a schematic flowchart of a method for feeding back channel state information according to another embodiment of the present application.

Based on any of the above embodiments, FIG. 2 is a schematic flowchart of a method for feeding back channel state information (CSI) according to another embodiment of the present application. As shown in FIG. 2, the method is performed by a network side, such as a base station, and the method includes:

step 210: transmitting beamformed channel state information reference signals (CSI-RSs), or the beamformed CSI-RSs and frequency domain basis vector indication information to the terminal by means of the antenna ports; where beams used in beamforming are determined based on spatial domain basis vectors or based on the spatial domain basis vectors and frequency domain basis vectors, and the spatial domain basis vectors and the frequency domain basis vectors are determined based on an uplink channel.

Specifically, the network side pre-estimates the uplink channel, and transmits the beamformed CSI-RSs, or the beamformed CSI-RSs and the frequency domain basis vector indication information to the terminal, and the terminal can obtain the information of the uplink channel.

Here, if the network side only transmits the beamformed CSI-RSs to the terminal, the beams used in beamforming are determined based on the spatial domain basis vectors and the frequency domain basis vectors corresponding to the uplink channel; if the beamforming CSI-RS transmits not only the beamformed CSI-RSs, but also the frequency domain basis vector indication information to the terminal, the beams used in beamforming can be determined only based on the spatial domain basis vector corresponding to the uplink channel, or can be determined based on the spatial domain basis vectors and the frequency domain basis vectors corresponding to the uplink channel, and the frequency domain basis vector indication information is used to indicate the frequency domain basis vectors which is not used to determine the beams used in beamforming. The frequency domain basis vector indication information may be transmitted to the terminal by any one of radio resource control (RRC), media access control-control element (MAC-CE) and downlink control information (DCI) signaling.

Further, the beams used in beamforming can be determined based on the angle information of the uplink channel, or the angle information and delay information of the uplink channel; the angle information is determined based on the spatial domain basis vectors, and the delay information is determined based on the frequency domain basis vectors.

Correspondingly, the network side pre-estimates and obtains the angle information and delay information of the uplink channel, and transmits the beamformed CSI-RSs, or the beamformed CSI-RSs and the frequency domain basis vector indication information to the terminal, and the terminal can obtain the angle information and delay information of the uplink channel.

Here, if the network side only transmits the beamformed CSI-RSs to the terminal, the beams used in beamforming are determined based on the angle information and delay information of the uplink channel; if the network side transmits not only the beamformed CSI-RSs, but also the frequency domain basis vector indication information to the terminal, the beams used in beamforming can be determined only based on the angle information of the uplink channel, or can be determined based on the angle information and delay information of the uplink channel, and the frequency domain basis vector indication information is used to indicate the frequency domain basis vector which is not used to determine the beams used in beamforming.

It should be noted that the spatial domain basis vectors used for determining the angle information of the uplink channel can be expressed as eigenvector, DFT, DCT, polynomial coefficient, KLT and the like. The frequency domain basis vectors of the delay information can be expressed as DFT, DCT, polynomial coefficient and the like. The specific number of spatial domain basis vectors and the specific number of frequency domain basis vectors may be either pre-agreed between the network side and the terminal or configured by the network side to the terminal through signaling, which is not limited in this embodiment of the present application.

Step 220: receiving port indication information and port combination coefficients for data transmission fed back by the terminal; the port indication information and port combination coefficients are determined by the terminal based on the beamformed CSI-RSs, or the beamformed CSI-RSs and frequency domain basis vector indication information.

Specifically, due to the reciprocity of the angle information and the delay information of the uplink and downlink channels, namely the equivalence between uplink and downlink channels in terms of the angle information and the delay information, the uplink and downlink channels correspond to the same spatial domain basis vectors and frequency domain basis vectors. After receiving the beamformed CSI-RSs, or the beamformed CSI-RSs and the frequency domain basis vector indication information, instead of calculating the angle information and delay information of the downlink channel, the terminal can directly use the beamformed CSI-RSs, or the beamformed CSI-RSs and the frequency domain basis vector indication information, to obtain the spatial domain basis vectors and frequency domain basis vectors that can be used to determine the angle information and delay information of the downlink channel, and then select the ports for data transmission, and generate port indication information and port combination coefficients corresponding to each port indicated by the port indication information. Immediately, the terminal feeds back the port indication information and the port combination coefficients to the network side, and the network side receives the port indication information and port combination coefficients fed back by the terminal.

Step 230: determining precoding of the downlink transmission data based on the port indication information and the port combination coefficients.

In the method provided by the embodiment of the present application, the reciprocity of angle information and delay information of uplink and downlink channels is applied, and the terminal can determine the port indication information and port combination coefficients for data transmission based on the beamformed CSI-RSs, or the beamformed CSI-RSs and the frequency domain basis vector indication information without additionally calculating the delay information of the downlink channel, which decreases the computational complexity of the terminal, reduces the feedback overhead of the terminal and further improves system performance.

Based on any of the above embodiments, step 210 includes: transmitting first beamformed CSI-RSs to the terminal by means of the antenna port; the first beams used in beamforming the first CSI-RSs is determined based on all spatial domain basis vectors and all frequency domain basis vectors.

Specifically, in order to ensure downlink signaling or CSI-RS resource overhead, the network side can implicitly transmit the frequency domain basis vectors to the terminal by transmitting the first beamformed CSI-RSs to the terminal.

The first CSI-RSs are CSI-RSs when the network side implicitly transmits the frequency domain basis vectors, the first beams are beams used in beamforming the first CSI-RSs, and the beams corresponding to all the first CSI-RSs need to be calculated based on all the spatial domain basis vectors used to determine the angle information of the uplink channel and all the frequency domain basis vectors used to determine the delay information of the uplink channel. Therefore, on the terminal side, all the spatial domain basis vectors and all the frequency domain basis vectors can be obtained only by means of each first CSI-RS.

Based on any of the above embodiments, in the case where the network side transmits the first beamformed CSI-RSs to the terminal, the number of the spatial domain basis vectors is 2L, the number of the frequency domain basis vectors is M, and both L and M are positive integers; the number of the first beams is not less than $2L+M-1$; 2L or more first beams are determined based on 2L spatial domain basis vectors, and $M-1$ or more first beams are determined based on preset spatial domain basis vector and $M-1$ frequency domain basis vectors; the preset spatial domain basis vector is one of the 2L spatial domain basis vectors.

Here, L and M are both codebook parameters, and L and M may be configured by the network side to the terminal through signaling or may be predetermined by the network side and the terminal. Among the M frequency domain basis vectors, there is a frequency domain basis vector with all elements being 1, that is, the first frequency domain basis vector.

Among $2L+M-1$ or more first beams, 2L or more first beams are obtained by calculating the Kronecker product of the 2L spatial domain basis vectors and the first frequency domain basis vector, respectively. Since all elements of the first frequency domain basis vector are 1, the above 2L or more first beams may also be recorded as being determined based on the 2L spatial domain basis vectors respectively.

$M-1$ or more first beams are obtained by calculating the Kronecker product of the preset spatial domain basis vectors and the $M-1$ frequency domain basis vectors, respectively. Here, the $M-1$ frequency domain basis vectors are frequency domain basis vectors other than the first frequency domain basis vector among the M frequency domain basis vectors. The preset spatial domain basis vector is a spatial domain basis vector selected in advance from the 2L spatial domain basis vectors, and the preset spatial domain basis vector may be pre-agreed between the network side and the terminal, or may be configured by the network side to the terminal through signaling, which is not limited in this embodiment of the present application.

By the method provided by the embodiment of the present application, transmission of the frequency domain basis vectors is realized implicitly through first CSI-RSs beamformed by $2L+M-1$ first beams, which saves the downlink signaling overhead while reducing the computational complexity of the terminal.

Based on any of the foregoing embodiments, step 210 includes: transmitting second beamformed CSI-RSs and frequency domain basis vector indication information to the terminal by means of the antenna ports; where second beams used in beamforming the second CSI-RSs are determined based on all the spatial domain basis vectors and a part of the frequency domain basis vectors, and the frequency domain basis vector indication information is configured to indicate the other part of the frequency domain basis vectors.

Specifically, the network side may also explicitly transmit the frequency domain basis vectors to the terminal by transmitting the second beamformed CSI-RSs and the frequency domain basis vector indication information to the terminal.

The second CSI-RSs are CSI-RSs when the network side explicitly transmits the frequency domain basis vectors, and the second beams are beams used in beamforming the second CSI-RSs. The frequency domain basis vectors used to determine the delay information of the uplink channel are divided into two parts, one of which is used to cooperate with all the spatial domain basis vectors to determine the second beams corresponding to the second CSI-RSs which is implicitly transmitted to the terminal through beamforming, and the other part of which constitutes the frequency domain basis vector indication information which is explicitly transmitted to the terminal. Therefore, on the terminal side, all the spatial domain basis vectors and a part of the frequency domain basis vectors can be obtained by each second CSI-RS, the other part of the frequency domain basis vectors can be obtained by the frequency domain basis vector indication information, and all the spatial domain basis vectors and all the frequency domain basis vectors are obtained.

It should be noted that when the frequency domain basis vectors are divided, the frequency domain basis vectors for determining the second beam may be one or more, and the number of the frequency domain basis vectors may be pre-agreed between the network side and the terminal or may be configured by the network side to the terminal through signaling.

Based on any of the above embodiments, in the case where the network side transmits the second beamformed CSI-RSs and frequency domain basis vector indication information to the terminal, the number of the spatial domain basis vectors is 2L, the number of the frequency domain basis vectors is M, and both L and M are positive integers; the number of the second beams is not less than 2LM', and M' is a positive integer less than M; 2LM' or more second beams are determined based on 2L spatial domain basis vectors and any M' frequency domain basis vectors; the any M' frequency domain basis vectors include a first frequency domain basis vector, and all the elements of the first frequency domain basis vector are 1.

Here, L, M, and M' are codebook parameters, and L, M, and M' may be configured by the network side to the terminal through signaling or may be predetermined by the network side and the terminal. The M frequency domain basis vectors are divided into two parts, that is, M' frequency domain basis vectors and M−M' frequency domain basis vectors.

2LM' or more second beams are obtained by calculating the Kronecker product of the 2L spatial domain basis vectors and the M' frequency domain basis vectors respectively. Since there is a first frequency domain basis vector with all elements being 1 among the M' frequency domain basis vectors, 2L or more second beams among the above 2LM' or more second beams, can also be recorded as being determined based on 2L spatial domain basis vectors respectively.

Based on any of the above embodiments, in the case where the network side transmits the second beamformed CSI-RSs and frequency domain basis vector indication information to the terminal, the frequency domain basis vector indication information includes $$\left\lceil \log_2 \binom{N_3 - 1}{M - M'} \right\rceil$$

bits indication information for indicating M−M' frequency domain basis vectors, where $N_3$ is the number of PMI subbands; or, the frequency domain basis vector indication information includes $\lceil \log_2(\alpha M) \rceil$ bits for indicating the starting points of M−M' frequency domain basis vectors, and $$\left\lceil \log_2 \binom{\alpha M - 1}{M - M'} \right\rceil$$

bits indication information for indicating M−M' frequency domain basis vectors; or, the frequency domain basis vector indication information includes $\lceil \log_2(M-1) \rceil$ bits for indicating consecutive M frequency domain basis vectors.

Based on any of the above embodiments, in step 210, the beams used in beamforming are obtained by calculating Kronecker product of the spatial domain basis vectors and the frequency domain basis vectors.

Specifically, for any spatial domain basis vector and any frequency domain basis vector, the Kronecker product of the two can be taken as the beams corresponding to the spatial domain basis vector and the frequency domain basis vector.

Based on any of the foregoing embodiments, the method further includes before step 210, receiving the SRSs transmitted by the terminal; determining the spatial domain basis vectors and the frequency domain basis vectors corresponding to the uplink channel based on the SRSs.

Specifically, after receiving the SRSs transmitted by the terminal, the network side can estimate the uplink channel based on the SRSs, and then determine corresponding spatial domain basis vectors and frequency domain basis vectors based on the uplink channel, and determine the beams used in beamforming on this basis or based on the spatial domain basis vectors and the frequency domain basis vectors.

Further, the uplink channel $\hat{H}^{UL}$ can be estimated based on the SRSs, and then the angle information and delay information of the uplink channel can be calculated using $\hat{H}^{UL}$, where the angle information and the delay information can be respectively obtained by performing inverse Fourier transform on $\hat{H}^{UL}$ using a set of spatial domain compression basis vectors and a set of frequency domain basis vectors, that is, the angle information and delay information of the uplink channel can be determined by a set of spatial domain basis vectors and a set of frequency domain basis vectors.

Figure 3:
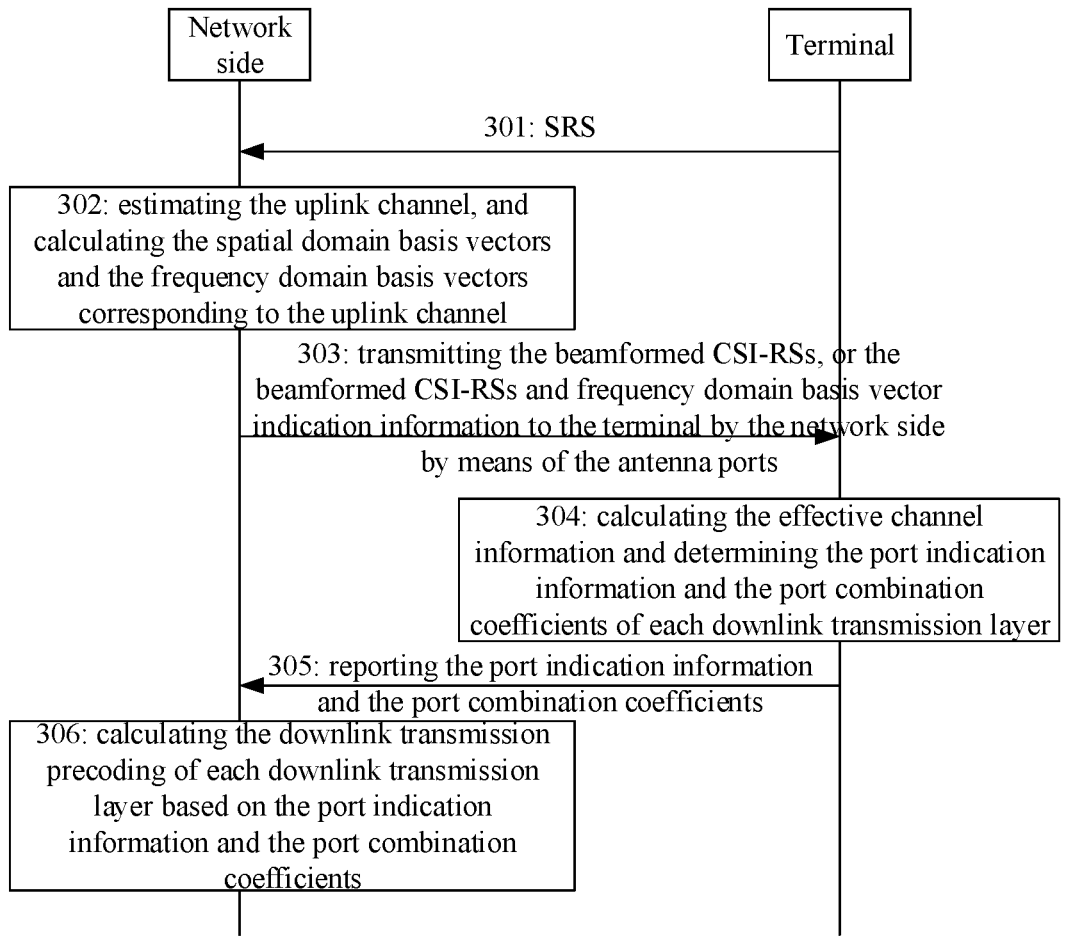
FIG. 3 is a schematic flowchart of a method for feeding back channel state information according to yet another embodiment of the present application.

Based on any of the above embodiments, FIG. 3 is a schematic flowchart of a method for feeding back channel state information (CSI) according to another embodiment of the present application. As shown in FIG. 3, it is assumed that the terminal uses an antenna to send uplink signals, $N_r$ roots receive downlink signals, and downlink transmits a layer of data. A dual-polarized two-dimensional planar antenna array is configured on the network side, and the antenna array is mapped into $2N_1N_2$ transmitting antenna ports, where $N_1$ and $N_2$ represent the numbers of antenna ports in the horizontal and vertical directions respectively, the number of PMI subbands is $N_3$, and each subband has a size of 1 PRB.

The method for feeding back channel state information includes the following steps:

step 301: transmitting the SRSs to the network side by the terminal, the comb structure of SRS being 4 here, and step 302: estimating, by the network side, the uplink channel, and calculating the spatial domain basis vectors and the frequency domain basis vectors corresponding to the uplink channel.

After obtaining the SRSs, the network side estimates the uplink channel $\hat{H}^{UL}$ on subcarriers containing the SRSs according to the SRSs. Assuming that $\hat{H}_1^{UL}$, $\hat{H}_2^{UL} \in \mathbb{C}^{N_1N_2 \times 1}$ represent the channel in the first and second polarization directions on the corresponding carrier respectively, $N_1N_2$ power values are then calculated through $\|v_i'^H \hat{H}^{UL}\|$, i=0, ..., $N_1N_2-1$ in the way of traversal $\hat{H}^{UL} \in \mathbb{C}^{N_1N_2 \times 1}$ represents the channel average value of each subcarrier containing the SRSs in two polarization directions, and $v'_i$ represents the ith spatial domain basis vector. The network side selects 2L spatial domain basis vectors which have the largest power and are orthogonal, and the same spatial domain basis vector are selected in the two polarization directions, then the matrix constituted by the 2L spatial domain basis vectors selected by the network side is $$V = \begin{bmatrix} v_0 & v_1 & \cdots & v_{L-1} & & & & 0 \\ & & 0 & & v_0 & v_1 & \cdots & v_{L-1} \end{bmatrix} \in \mathbb{C}^{2N_1N_2 \times 2L}.$$

For the nth subband channel $H_n^{UL} = \Sigma_{j=0}^{2} H_j'^{UL}$, $H_j'^{UL}$ represents the jth channel containing SRS subcarrier in the nth subband, it is assumed that the comb structure of SRS is 4, and there are 3 subcarriers containing SRS in each PRB. The combination coefficient of this subband can be calculated as $V^H H_n^{UL} \in \mathbb{C}^{2L \times 1}$, and similarly, the combination coefficients of $N_3$ subbands can be obtained, and the combination coefficients of all subbands can be expressed as $W_2 \in \mathbb{C}^{2L \times N_3}$.

The network side calculates the power by compressing each subband coefficient through $f_j^H W_2^H W_2 f_j$, j=0, ..., $N_3-1$ in a traversal way, where $f_j$ represents that compression is performed on each subband combination coefficients in $W_2$ using the jth frequency domain basis vector. M frequency domain basis vectors, which corresponds to the maximum power obtained by compressing to each subband coefficient are selected from the candidate $N_3$ frequency domain compression base vectors, and then the indexes corresponding to the selected M frequency domain basis vectors are sorted in ascending order.

If the minimum index corresponding to each frequency domain basis vector is not 0, phase rotation can be performed on the frequency domain basis vector corresponding to the minimum index using the phase rotation method, and the index corresponding to the frequency domain basis vector is always 0. The same phase rotation is also performed on another frequency domain basis vectors, that is, the index corresponding to another frequency domain basis vectors is obtained by subtracting the minimum index value of the frequency domain basis vector on which no phase rotation is performed from the corresponding index value on which the phase rotation is performed. For example, the matrix constituted by each frequency domain basis vector is $W_f$, and the indexes corresponding to the M frequency domain basis vectors before the phase rotation is performed are $k_0, \ldots, k_m, \ldots, k_{M-1}$, where $k_0$ represents the minimum index corresponding to each frequency domain. The phase rotation matrix is:

$$R_l = \begin{pmatrix} 1 & 0 & 0 & 0 & 0 \\ 0 & e^{j2\pi \frac{k_0}{N_3}} & 0 & 0 & 0 \\ 0 & 0 & e^{j2\pi \frac{2k_0}{N_3}} & 0 & 0 \\ 0 & 0 & 0 & \ddots & 0 \\ 0 & 0 & 0 & 0 & e^{j2\pi \frac{(N_3-1)k_0}{N_3}} \end{pmatrix}$$

Then each frequency domain basis vector on which phase rotation has been performed is $W_{f,l}^{(s)} = R_l W_{f,l}$, at this time, the indexes of the M frequency domain basis vectors are $0, \ldots, k_m-k_0, \ldots, k_{M-1}-k_0$. Note that the frequency domain basis vector corresponding to the above index which is 0 is a vector, of which all elements are 1 and length is $N_3$.

Step 303: transmitting the beamformed CSI-RSs, or the beamformed CSI-RSs and frequency domain basis vector indication information to the terminal by the network side by means of the antenna ports.

K=2LM candidate beams can be calculated by the network side through $b_{p,k} = v_{p,l} \otimes f_m \in \mathbb{C}^{N_1N_2N_3 \times 1}$, l=0, ..., L-1, m=0, ..., M-1, p=0, 1, k=lM+m, where $f_m$ represents M frequency domain basis vectors for determining the delay information of the uplink channel obtained by the SRSs.

The network side can transmit the beamformed CSI-RSs by means of 2L ports, where the first L ports transmit the CSI-RSs by using the antenna in the first polarization direction, and the beam used by each port is $b_{0,l} = v_l \otimes 1_{N_3} \in \mathbb{C}^{N_1N_2N_3 \times 1}$, l=0, ..., L-1, the last L ports transmit the CSI-RSs by using the antenna in the second polarization direction, the beam used by each port is $b_{1,l} = v_l \otimes 1_{N_3} \in \mathbb{C}^{N_1N_2N_3 \times 1}$, l=0, ..., L-1. Where $1_{N_3}$ is the first frequency domain basis vector among the M frequency domain basis vectors.

In addition, the network side constructs frequency domain basis vector indication information including frequency domain basis vectors other than the first frequency domain basis vector, and also transmits the frequency domain basis vector indication information to the terminal.

Step 304: calculating, by the terminal, the effective channel information and determining the port indication information and port combination coefficients of each downlink transmission layer.

The terminal receives the beamformed CSI-RS on 2L ports and can estimate that the effective channel of each port is $\hat{H}_{p,l,0}$, p=0, 1, l=0, L-1. Assuming that the effective channel estimated through the lth port in the p polarization direction is expressed as $$\hat{H}_{p,l,0} = \begin{bmatrix} H_{p,0} v_l \\ H_{p,1} v_l \\ \vdots \\ H_{p,N_3-1} v_l \end{bmatrix},$$

where $H_{p,1}$ represents the channel of the nth subband in the p-polarization direction. Then, 2L(M−1) multiple effective channel information can be calculated according to the frequency domain basis vector indication information including M−1 frequency domain basis vectors sent by the network side. If the index of the mth frequency domain basis vector on which phase rotation is performed is $k_m$, the beam still generated by the lth space basis vector $v_l$ and the mth frequency domain basis vector m in the p-polarization direction is $b_{p,k}=v_l \otimes f_m$, when the beam is used for transmission, its corresponding effective channel is $$\tilde{H}_{p,k} = \begin{bmatrix} I_{N_r} & 0 & 0 & 0 \\ 0 & e^{-j2\pi\frac{k_m}{N_3}}I_{N_r} & 0 & 0 \\ \cdots & \cdots & \ddots & \cdots \\ 0 & 0 & 0 & e^{-j2\pi\frac{(N_3-1)k_m}{N_3}}I_{N_r} \end{bmatrix} \begin{bmatrix} H_{p,0}v_l \\ H_{p,1}v_l \\ \vdots \\ H_{p,N_3-1}v_l \end{bmatrix}, k = lM + m.$$

Similarly, 2L(M−1) multiple effective channel information can be calculated, then a total K=2LM multiple effective channel information can be recorded as: $\tilde{H}_{eff}=[\tilde{H}_{0,0} \ldots \tilde{H}_{0,LM-1} \tilde{H}_{1,0} \ldots \tilde{H}_{1,LM-1}] \in \mathbb{C}^{N_r N_3 \times K}$.

Eigenvalue decomposition is performed on the covariance matrix $\tilde{H}_{eff}^H \tilde{H}_{eff}$ to obtain the eigenvector $\beta^1 \in \mathbb{C}^{K \times 1}$ corresponding to the largest eigenvalue, and then the elements in $\beta^1$ are sorted in an ascending order of the amplitude, $K_0$ elements with the largest amplitude are selected as the port combination coefficient, and the ports used by the effective channels corresponding to the $K_0$ port combination coefficients are used to calculate the precoding for downlink transmission of the data of this layer.

Step 305: reporting, by the terminal, the port indication information and the port combination coefficients.

The selected port indication information and port combination coefficients are reported to the network side through bitmap or combination coefficient $$\log_2 \binom{K}{K_0}.$$

Step 306: calculating, by the network side, the downlink transmission precoding of each downlink transmission layer based on the port indication information and the port combination coefficients:

$$W = \begin{bmatrix} \hat{b}_{0,0} & \cdots & \hat{b}_{0,K'} & 0 & \cdots & 0 \\ 0 & \cdots & 0 & \hat{b}_{1,0} & \cdots & \hat{b}_{1,K''} \end{bmatrix} \begin{bmatrix} \hat{\beta}_{0,0}^{DL} \\ \vdots \\ \hat{\beta}_{0,K'}^{DL} \\ \hat{\beta}_{1,0}^{DL} \\ \vdots \\ \hat{\beta}_{1,K''}^{DL} \end{bmatrix},$$

where $\hat{b}_{p,k}$ represents the kth beam selected by the terminal in the p-polarization direction, k=lM+m, p∈{0,1}. $\hat{b}_{p,k}$ is determined based on the port indication information.

Figure 4:
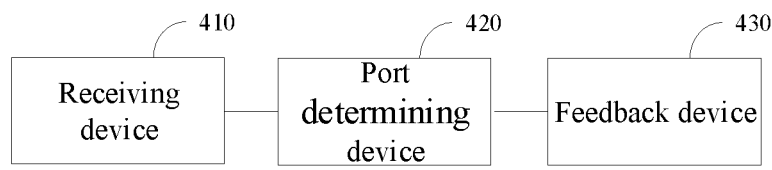
FIG. 4 is a schematic structural diagram of a device for feeding back channel state information according to an embodiment of the present application.

Based on any of the above embodiments, FIG. 4 is a schematic structural diagram of a device for feeding back channel state information according to an embodiment of the present application, and as shown in FIG. 4, the device includes a receiving device 410, a port determining device 420, and a feedback device 430, in which:

the receiving device 410 is configured to receive beamformed CSI-RSs or the beamformed CSI-RSs and frequency domain basis vector indication information transmitted by a network side by means of antenna ports; where the beams used in the beamforming is determined based on spatial domain basis vectors, or based on spatial domain basis vectors and the frequency domain basis vectors, and the spatial domain basis vectors and the frequency domain basis vectors are determined based on the uplink channel;

the port determining device 420 is configured to determine port indication information and port combination coefficients for data transmission based on the beamformed CSI-RSs, or the beamformed CSI-RSs and the frequency domain basis vector indication information; and the feedback device 430 is configured to feed back the port indication information and the port combination coefficients to the network side for determining precoding of downlink transmission data based on the port indication information and the port combination coefficients at the network side.

By the device provided by the embodiment of the present application, the reciprocity of angle information and delay information of uplink and downlink channels is applied, and the terminal can determine the port indication information and port combination coefficients for data transmission based on the beamformed CSI-RSs, or the beamformed CSI-RSs and the frequency domain basis vector indication information without additionally calculating the delay information of the downlink channel, which decreases the computational complexity of the terminal, reduces the feedback overhead of the terminal and further improves system performance.

Based on any of the above embodiments, the port determining device 420 includes:

a channel determining subunit, configured to determine multiple effective channel information based on the beamformed CSI-RSs, or the beamformed CSI-RSs and the frequency domain basis vector indication information; and a port determining subunit, configured to determine the port indication information and the port combination coefficients for data transmission based on the multiple effective channel information.

Based on any of the above embodiments, the receiving device 410 is configured to:

receive first beamformed CSI-RSs transmitted by the network side by means of the antenna ports;

where first beams used in beamforming the first CSI-RSs are determined based on all spatial domain basis vectors and all frequency domain basis vectors.

Based on any of the above embodiments, the number of the spatial domain basis vectors is 2L, the number of the frequency domain basis vectors is M, and both L and M are positive integers;

the number of the first beams is not less than 2L+M−1;

where 2L or more first beams are determined based on 2L spatial domain basis vectors, and M−1 or more first beams are determined based on preset spatial domain basis vector and M−1 frequency domain basis vectors; and the preset spatial domain basis vector is one of the 2L spatial domain basis vectors.

Based on any of the above embodiments, the channel determining subunit is configured to:

determine 2L or more pieces of first effective channel information based on the first CSI-RSs beamformed by 2L or more first beams;

determine M−1 frequency domain basis vectors and M−1 or more pieces of first effective channel information based on the first CSI-RSs beamformed by M−1 or more first beams;

determine (2L–1) (M–1) or more pieces of second effective channel information based on 2L–1 or more pieces of first effective channel information corresponding to preset beamformed CSI-RSs among 2L or more pieces of first effective channel information and M–1 frequency domain basis vectors; and take 2L+M–1 or more pieces of first effective channel information and (2L–1) (M–1) or more pieces of second effective channel information as the effective channel information.

Based on any of the above embodiments, the determining (2L–1) (M–1) or more pieces of second effective channel information based on 2L–1 or more pieces of first effective channel information corresponding to preset beamformed CSI-RSs in 2L or more pieces of first effective channel information and M–1 frequency domain basis vectors, includes:

respectively calculating a Hadamard product of each first piece of effective channel information corresponding to 2L–1 or more preset beamformed CSI-RSs and each frequency domain basis vector among M–1 frequency domain basis vectors to obtain (2L–1) (M–1) or more piece of second effective channel information.

Based on any of the above embodiments, the receiving device 410 is configured to:

receive second beamformed CSI-RSs and frequency domain basis vector indication information transmitted by the network side by means of the antenna ports;

where second beams used in beamforming the second CSI-RS are determined based on all the spatial domain basis vectors and a part of the frequency domain basis vectors, and the frequency domain basis vector indication information is configured to indicate the other part of the frequency domain basis vectors.

Based on any of the above embodiments, the number of the spatial domain basis vectors is 2L, the number of the frequency domain basis vectors is M, and both L and M are positive integers;

the number of the second beams is not less than 2LM', where M' is a positive integer less than M;

2LM' or more second beams are determined based on 2L spatial domain basis vectors and any M' frequency domain basis vector; any M' frequency domain basis vector includes a first frequency domain basis vector, and all the elements of the first frequency domain basis vector are 1;

the frequency domain basis vector indication information includes $$\left\lceil \log_2\binom{N_3-1}{M-M'} \right\rceil$$

bits indication information for indicating M–M' frequency domain basis vectors, and $N_3$ is the number of PMI subbands; or, the frequency domain basis vector indication information includes $\lceil \log_2(\alpha M) \rceil$ bits for indicating starting points of M–M' frequency domain basis vectors, and $$\left\lceil \log_2\binom{\alpha M-1}{M-M'} \right\rceil$$

bits indication information for indicating M–M' frequency domain basis vectors; or, the frequency domain basis vector indication information includes $\lceil \log_2(M-1) \rceil$ bits for indicating consecutive M frequency domain basis vectors.

Based on any of the above embodiments, the channel determining subunit is configured to:

determine 2LM' or more pieces of first effective channel information based on the second CSI-RSs beamformed by 2LM' or more second beams;

determine M–M' frequency domain basis vectors based on the frequency domain basis vector indication information;

determine 2L(M–M') or more pieces of second effective channel information based on the first effective channel information corresponding to 2L or more second beams determined based on the first frequency domain basis vector among 2LM' or more second beams, and M–M' frequency domain basis vectors; and take 2LM' or more pieces of first effective channel information and 2L(M–M') or more pieces of second effective channel information as the effective channel information.

Based on any of the above embodiments, the port determining subunit is configured to:

perform eigenvalue decomposition on a covariance matrix of the multiple effective channel information to obtain eigenvectors corresponding to the largest eigenvalues, the number of which is that of the downlink transmission layers;

select, from eigenvectors corresponding to any downlink transmission layer, non-zero elements with the largest amplitude, the number of which is not greater than a preset number of ports to obtain the port combination coefficient of the any downlink transmission layer; and determine the port indication information for data transmission of the any downlink transmission layer based on the port to which an effective channel corresponding to the port combination coefficient of any downlink transmission layer is applied.

Based on any one of the above embodiments, select, from eigenvectors corresponding to any downlink transmission layer, non-zero elements with the largest amplitude, the number of which is not greater than the preset number of ports to obtain the port combination coefficient of the any downlink transmission layer, includes:

select, from eigenvectors corresponding to any downlink transmission layer, non-zero elements with the largest amplitude, the number of which is not greater than the preset number of ports; and normalize and quantize the non-zero elements with the largest amplitude, the number of which is not greater than the preset number of ports, to obtain the port combination coefficient of the any downlink transmission layer.

Based on any of the above embodiments, the device further includes a sounding reference signal (SRS) transmitting device configured to:

transmit SRSs to the network side and determine the spatial domain basis vectors and the frequency domain basis vectors corresponding to the uplink channel based on the SRSs at the network side.

Figure 5:
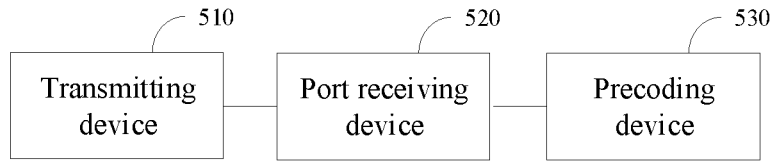
FIG. 5 is a schematic structural diagram of a device for feeding back channel state information according to another embodiment of the present application.

Based on any of the above embodiments, FIG. 5 is a schematic structural diagram of a device for feeding back channel state information (CSI) according to another embodiment of the present application. As shown in FIG. 5, the device includes a transmitting device 510, a port receiving device 520 and a precoding device 530, in which:

the transmitting device 510 is configured to transmit beamformed CSI-RSs, or beamformed CSI-RSs and the frequency domain basis vector indication information to the terminal by means of the antenna ports; where beams used in beamforming are determined based on spatial domain basis vectors or based on the spatial domain basis vectors and frequency domain basis vectors, and the spatial domain basis vectors and the frequency domain basis vectors are determined based on an uplink channel;

the port receiving device 520 is configured to receive port indication information and port combination coefficients for data transmission fed back by the terminal; the port indication information and the port combination coefficients are determined by the terminal based on the beamformed CSI-RSs, or the beamformed CSI-RSs and frequency domain basis vector indication information;

the precoding device 530 is configured to determine the precoding of the downlink transmission data based on the port indication information and the port combination coefficients.

By the device provided by the embodiment of the present application, the reciprocity of angle information and delay information of uplink and downlink channels is applied, and the terminal can determine the port indication information and port combination coefficients for data transmission based on the beamformed CSI-RSs, or the beamformed CSI-RSs and the frequency domain basis vector indication information without additionally calculating the delay information of the downlink channel, which decreases the computational complexity of the terminal, reduces the feedback overhead of the terminal and further improves system performance.

Based on any of the above embodiments, the transmitting device 510 is configured to:
transmit first beamformed CSI-RSs to the terminal by means of the antenna ports;
where first beams used in beamforming the first CSI-RS are determined based on all spatial domain basis vectors and all frequency domain basis vectors.

Based on any of the above embodiments, the number of the spatial domain basis vectors is 2L, the number of the frequency domain basis vectors is M, and both L and M are positive integers;
the number of the first beams is not less than 2L+M−1;
where 2L or more first beams are determined based on 2L spatial domain basis vectors, and M−1 or more first beams are determined based on preset spatial domain basis vector and M−1 frequency domain basis vectors; the preset spatial domain basis vector is one of the 2L spatial domain basis vectors.

Based on any of the above embodiments, the transmitting device 510 is configured to:
transmit second beamformed CSI-RSs and frequency domain basis vector indication information to the terminal by means of the antenna ports;
where second beams used in beamforming the second CSI-RSs are determined based on all the spatial domain basis vectors and a part of the frequency domain basis vectors, and the frequency domain basis vector indication information is configured to indicate the other part of the frequency domain basis vectors.

Based on any of the above embodiments, the number of the spatial domain basis vectors is 2L, the number of the frequency domain basis vectors is M, and both L and M are positive integers;

the number of the second beams is not less than 2LM', and M' is a positive integer less than M;
2LM' or more second beams are determined based on 2L spatial domain basis vectors and any M' frequency domain basis vectors; any M' frequency domain basis vector includes a first frequency domain basis vector, and all the elements of the first frequency domain basis vector are 1;
the frequency domain basis vector indication information includes $$\left\lceil \log_2 \binom{N_3 - 1}{M - M'} \right\rceil$$

bits indication information for indicating M−M' frequency domain basis vectors, and $N_3$ is the number of PMI subbands; or
the frequency domain basis vector indication information includes $\lceil \log_2(\alpha M) \rceil$ bits for indicating starting points of M−M' frequency domain basis vectors, and $$\left\lceil \log_2 \binom{\alpha M - 1}{M - M'} \right\rceil$$

bits indication information for indicating M−M' frequency domain basis vectors; or
the frequency domain basis vector indication information includes $\lceil \log_2(M-1) \rceil$ bits for indicating consecutive M frequency domain basis vectors.

Based on any of the above embodiments, the beams used in beamforming are obtained by calculating a Kronecker product of the spatial domain basis vectors and the frequency domain basis vectors.

Based on any of the above embodiments, the device further includes a sounding reference signal (SRS) receiving device configured to:
receive SRSs transmitted by the terminal; and
determine the spatial domain basis vectors and the frequency domain basis vectors corresponding to the uplink channel based on the SRSs.

Figure 6:
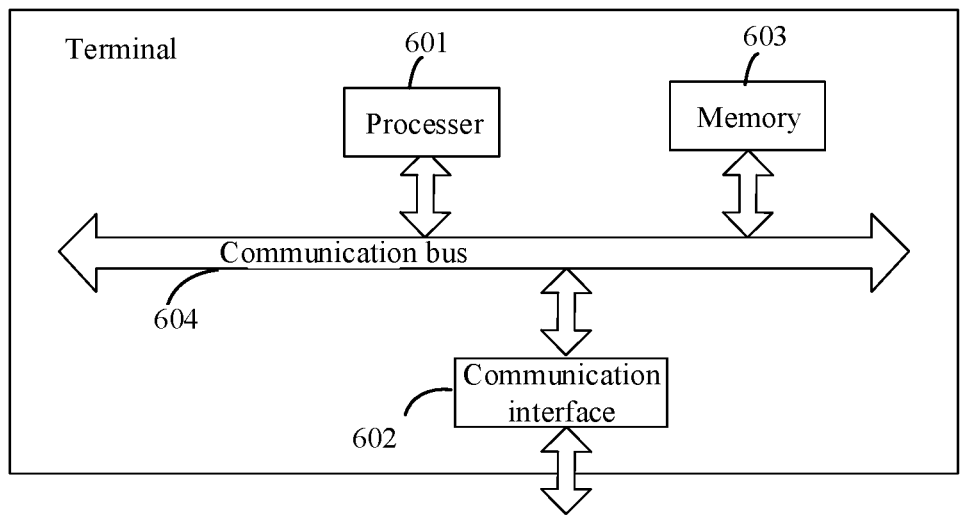
FIG. 6 is a schematic structural diagram of a terminal according to an embodiment of the present application.

FIG. 6 is a schematic diagram showing physical structure of a terminal according to an embodiment of the present application, and as shown in FIG. 6, the terminal may include: a processor 601, a communication interface 602, a memory 603, and a communication bus 604, where the processor 601, the communication interface 602, and the memory 603 communicate with each other through the communication bus 604. The processor 601 may call computer programs that are stored on the memory 603 and executable on the processor 601 to implement the following steps: receiving beamformed CSI-RSs, or the beamformed CSI-RSs and frequency domain basis vector indication information transmitted by a network side by means of antenna ports; where beams used in beamforming are determined based on spatial domain basis vectors, or based on the spatial domain basis vectors and frequency domain basis vectors, and the spatial domain basis vectors and the frequency domain basis vectors are determined based on an uplink channel; determining port indication information and port combination coefficients for data transmission based on the beamformed CSI-RSs, or the beamformed CSI-RSs and the frequency domain basis vector indication information; feeding back the port indication information and the port combination coefficients to the network side and determining precoding of downlink transmission data based on the port indication information and the port combination coefficients at the network side.

It should be noted here that the terminal in the present embodiment can implement all the method steps in the foregoing method embodiments and can achieve the same effects. The same parts and the same effects in this embodiment as in the method embodiment will not be repeated here.

In addition, the logic instructions in the memory 603 described above may be implemented in the form of software functional units and may be stored in a computer readable storage medium while being sold or used as a separate product. Based on such understanding, the embodiments of the present application in essence, or the parts that contributes to the prior art or the parts of the embodiments can be embodied in the form of software product, which is stored in a storage medium and includes several instructions to cause a computer device (for example, a personal computer, a server, a terminal and the like) to perform all or part of the steps of the method described in various embodiments of the present application. The storage medium described above includes various media that can store program codes such as U disk, mobile hard disk, read-only memory (ROM), random access memory (RAM), magnetic disk, and compact disk.

Figure 7:
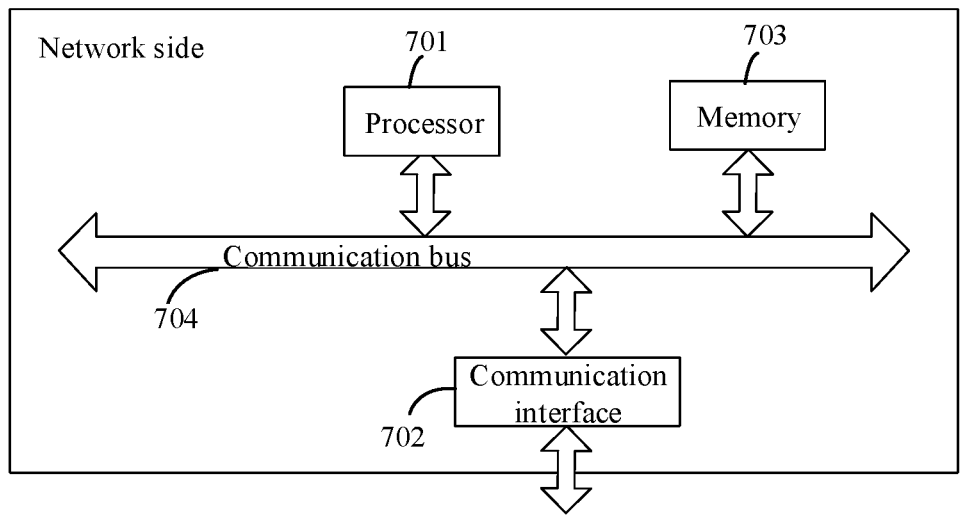
FIG. 7 is a schematic structural diagram of a network side according to an embodiment of the present application.

FIG. 7 is a schematic diagram showing physical structure of a network side provided by an embodiment of the present application, and as shown in FIG. 7, the network side may include: a processor 701, a communications interface 702, a memory 703, and a communication bus 704, where the processor 701, the communication interface 702, and the memory 703 communicate with each other through the communication bus 704. The processor 701 may call computer programs that are stored on the memory 703 and executable on the processor 701 to implement the following steps: transmitting beamformed CSI-RSs, or the beamformed CSI-RSs and frequency domain basis vector indication information to the terminal by means of the antenna ports; where beams used in beamforming are determined based on spatial domain basis vectors or based on the spatial domain basis vectors and frequency domain basis vectors, and the spatial domain basis vectors and the frequency domain basis vectors are determined based on an uplink channel; receiving port indication information and port combination coefficients for data transmission fed back by the terminal; the port indication information and the port combination coefficients are determined by the terminal based on the beamformed CSI-RSs, or the beamformed CSI-RSs and frequency domain basis vector indication information; determining precoding of the downlink transmission data based on the port indication information and the port combination coefficients.

It should be noted here that the network side in this embodiment can implement all the method steps in the foregoing method embodiments and can achieve the same effect. The same parts and the same effect in this embodiment as in the method embodiment will not be repeated here.

In addition, the logic instructions in the memory 703 described above may be implemented in the form of software functional units and may be stored in a computer readable storage medium while being sold or used as a separate product. Based on such understanding, the embodiments of the present application in essence, or the parts that contributes to the prior art or the parts of the embodiments can be embodied in the form of software product, which is stored in a storage medium and includes several instructions to cause a computer device (for example, a personal computer, a server, a network device and the like) to perform all or part of the steps of the method described in various embodiments of the present application. The storage medium described above includes various media that can store program codes such as U disk, mobile hard disk, read-only memory (ROM), random access memory (RAM), magnetic disk, and compact disk.

Embodiments of the present application further provide a non-transitory computer-readable storage medium, having a computer program stored thereon, and when being executed by a processor, the computer program causes the processor to implement the methods for feeding back channel state information according to the above embodiments, for example, including: receiving beamformed CSI-RSs, or the beamformed CSI-RSs and frequency domain basis vector indication information transmitted by a network side by means of antenna ports; where beams used in beamforming are determined based on angle information of an uplink channel, or based on the angle information and delay information of an uplink channel; the angle information is determined based on the spatial domain basis vectors, and the delay information is determined based on the frequency domain basis vectors; determining port indication information and port combination coefficients for data transmission based on the beamformed CSI-RSs, or the beamformed CSI-RSs and the frequency domain basis vector indication information; feeding back the port indication information and the port combination coefficients to the network side for determining precoding of downlink transmission data based on the port indication information and the port combination coefficients at the network side.

Embodiments of the present application further provide a non-transitory computer-readable storage medium having a computer program stored thereon, and when being executed by a processor, the computer program causes the processor to implement the channel state information feedback methods provided in the above embodiments, for example, including: transmitting beamformed CSI-RSs, or the beamformed CSI-RSs and frequency domain basis vector indication information to the terminal by means of the antenna port; where the beams used in beamforming are determined based on a spatial domain basis vectors or based on the spatial domain basis vectors and frequency domain basis vectors, and the spatial domain basis vectors and the frequency domain basis vectors are determined based on an uplink channel; receiving port indication information and port combination coefficients for data transmission fed back by the terminal; the port indication information and the port combination coefficients are determined by the terminal based on the beamformed CSI-RSs, or the beamformed CSI-RSs and frequency domain basis vector indication information; determining the precoding of the downlink transmission data based on the port indication information and the port combination coefficients.

The device embodiments described above are merely illustrative, and the devices described as separate components may or may not be physically separate, and the components displayed as devices may or may not be physical devices, that is, may be located at the same place or be distributed to multiple network devices. Some or all of the modules may be selected according to actual needs to achieve the purpose of the solution of the present embodiment.

Through the description of the embodiments above, the various embodiments can be implemented by means of software and a necessary general hardware platform, and of course, by hardware. Based on such understanding, the above embodiments of the present application in essence or a part of the embodiments that contributes to the prior art may be embodied in the form of a software product, which may be stored in a storage medium such as ROM/RAM, magnetic disk, compact disk and the like, and includes several instructions to cause a computer device (which may be a personal computer, server, network device and the like) to perform the methods described in various embodiments or a part thereof.

What is claimed is:

1. A method for feeding back channel state information (CSI), comprising:

receiving beamformed channel state information reference signals (CSI-RSs) or the beamformed CSI-RSs and frequency domain basis vector indication information transmitted by a network side by means of antenna ports; wherein beams used in beamforming are determined based on spatial domain basis vectors, or based on the spatial domain basis vectors and frequency domain basis vectors, and the spatial domain basis vectors and the frequency domain basis vectors are determined based on an uplink channel;

determining port indication information and port combination coefficients for data transmission based on the beamformed CSI-RSs, or the beamformed CSI-RSs and the frequency domain basis vector indication information; and feeding back the port indication information and the port combination coefficients to the network side for determining precoding of downlink transmission data based on the port indication information and the port combination coefficients at the network side.

2. The method of claim 1, wherein the determining port indication information and port combination coefficients for data transmission based on the beamformed CSI-RSs, or the beamformed CSI-RSs and the frequency domain basis vector indication information, comprises:

determining multiple effective channel information based on the beamformed CSI-RSs, or the beamformed CSI-RSs and the frequency domain basis vector indication information; and determining the port indication information and the port combination coefficients for data transmission based on the multiple effective channel information.

3. The method of claim 2, wherein the receiving beamformed CSI-RSs, or the beamformed CSI-RSs and frequency domain basis vector indication information transmitted by a network side by means of antenna ports, specifically comprises:

receiving first beamformed CSI-RSs transmitted by the network side by means of the antenna ports;

wherein first beams used in beamforming the first CSI-RSs are determined based on all spatial domain basis vectors and all frequency domain basis vectors.

4. The method of claim 3, wherein the number of the spatial domain basis vectors is 2L, the number of the frequency domain basis vectors is M, and both L and M are positive integers;

the number of the first beams is not less than 2L+M−1;

wherein 2L or more first beams are determined based on 2L spatial domain basis vectors, and M−1 or more first beams are determined based on preset spatial domain basis vector and M−1 frequency domain basis vectors; the preset spatial domain basis vector is one of the 2L spatial domain basis vectors.

5. The method of claim 2, wherein the receiving beamformed CSI-RSs, or the beamformed CSI-RSs and frequency domain basis vector indication information transmitted by a network side by means of antenna ports, specifically comprises:

receiving second beamformed CSI-RSs and frequency domain basis vector indication information transmitted by the network side by means of the antenna ports;

wherein second beams used in beamforming the second CSI-RSs are determined based on all the spatial domain basis vectors and a part of the frequency domain basis vectors, and the frequency domain basis vector indication information is configured to indicate the other part of the frequency domain basis vectors.

6. The method of claim 2, wherein the determining the port indication information and the port combination coefficients for data transmission based on the multiple effective channel information comprises:

performing eigenvalue decomposition on a covariance matrix of the multiple effective channel information to obtain eigenvectors corresponding to the largest eigenvalues, the number of which is that of the downlink transmission layers;

selecting, from eigenvectors corresponding to any downlink transmission layer, non-zero elements with the largest amplitude, the number of which is not greater than a preset number of ports, to obtain a port combination coefficient of the any downlink transmission layer; and determining the port indication information for data transmission of the any downlink transmission layer based on the port to which an effective channel corresponding to the port combination coefficient of the any downlink transmission layer is applied;

wherein the selecting, from eigenvectors corresponding to any downlink transmission layer, non-zero elements with the largest amplitude, the number of which is not greater than the preset number of ports, to obtain the port combination coefficient of the any downlink transmission layer, comprises:

selecting, from eigenvectors corresponding to any downlink transmission layer, non-zero elements with the largest amplitude, the number of which is not greater than the preset number of ports; and normalizing and quantizing the non-zero elements with the largest amplitude, the number of which is not greater than the preset number of ports, to obtain the port combination coefficient of the any downlink transmission layer.

7. The method of claim 1, further comprising: before receiving the beamformed CSI-RSs, or the beamformed CSI-RSs and frequency domain basis vector indication information transmitted by a network side by means of antenna ports, transmitting sounding reference signals (SRSs) to the network side and determining the spatial domain basis vectors and the frequency domain basis vectors corresponding to the uplink channel based on the SRSs at the network side.

8. A method for feeding back channel state information (CSI), comprising:

transmitting beamformed channel state information reference signals (CSI-RSs) or the beamformed CSI-RSs and frequency domain basis vector indication information to a terminal by means of antenna ports; wherein beams used in beamforming are determined based on spatial domain basis vectors or based on the spatial domain basis vectors and frequency domain basis vectors, and the spatial domain basis vectors and the frequency domain basis vectors are determined based on an uplink channel;

receiving port indication information and port combination coefficients for data transmission fed back by the terminal; wherein the port indication information and the port combination coefficients are determined by the terminal based on the beamformed CSI-RSs, or the beamformed CSI-RSs and frequency domain basis vector indication information; and determining precoding of the downlink transmission data based on the port indication information and the port combination coefficients.

9. The method of claim 8, wherein the transmitting beamformed CSI-RSs, or the beamformed CSI-RSs and frequency domain basis vector indication information to a terminal by means of antenna ports, comprises:

transmitting first beamformed CSI-RSs to the terminal by means of the antenna ports;

wherein first beams used in beamforming the first CSI-RSs are determined based on all spatial domain basis vectors and all frequency domain basis vectors;

wherein the number of the spatial domain basis vectors is 2L, the number of the frequency domain basis vectors is M, and both L and M are positive integers;

the number of the first beams is not less than 2L+M−1;

wherein 2L or more first beams are determined based on 2L spatial domain basis vectors, and M−1 or more first beams are determined based on a preset spatial domain basis vector and M−1 frequency domain basis vectors;

the preset spatial domain basis vector is one of the 2L spatial domain basis vectors; or transmitting second beamformed CSI-RSs and frequency domain basis vector indication information to the terminal by means of the antenna ports;

wherein second beams used in beamforming the second CSI-RSs are determined based on all the spatial domain basis vectors and a part of the frequency domain basis vectors, and the frequency domain basis vector indication information is configured to indicate the other part of the frequency domain basis vectors.

10. The method of claim 8, further comprising: before transmitting the beamformed CSI-RSs, or the beamformed CSI-RSs and the frequency domain basis vector indication information to the terminal by means of the antenna ports, receiving sounding reference signals (SRSs) transmitted by the terminal; and determining the spatial domain basis vectors and the frequency domain basis vectors corresponding to the uplink channel based on the SRSs.

11. A terminal, comprising a memory, a processor, and a program stored in the memory and executable on the processor, wherein the program, when being executed on the processor, causes the processor to implement the following steps:

receiving beamformed channel state information reference signals (CSI-RSs) or the beamformed CSI-RSs and frequency domain basis vector indication information transmitted by a network side by means of antenna ports; wherein beams used in beamforming are determined based on spatial domain basis vectors, or based on the spatial domain basis vectors and frequency domain basis vectors, and the spatial domain basis vectors and the frequency domain basis vectors are determined based on an uplink channel;

determining port indication information and port combination coefficients for data transmission based on the beamformed CSI-RSs, or the beamformed CSI-RSs and the frequency domain basis vector indication information; and feeding back the port indication information and the port combination coefficients to the network side for determining precoding of downlink transmission data based on the port indication information and the port combination coefficients at the network side.

12. The terminal of claim 11, wherein the determining port indication information and port combination coefficients for data transmission based on the beamformed CSI-RSs, or the beamformed CSI-RSs and the frequency domain basis vector indication information, comprises:

determining multiple effective channel information based on the beamformed CSI-RSs, or the beamformed CSI-RSs and the frequency domain basis vector indication information; and determining the port indication information and the port combination coefficients for data transmission based on the multiple effective channel information.

13. The terminal of claim 12, wherein the receiving beamformed CSI-RSs, or the beamformed CSI-RSs and frequency domain basis vector indication information transmitted by a network side by means of antenna ports, comprises:

receiving first beamformed CSI-RSs transmitted by the network side by means of the antenna ports;

wherein first beams used in beamforming the first CSI-RSs are determined based on all spatial domain basis vectors and all frequency domain basis vectors.

14. The terminal of claim 13, wherein the number of the spatial domain basis vectors is 2L, the number of the frequency domain basis vectors is M, and both L and M are positive integers;

the number of the first beams is not less than 2L+M−1;

wherein 2L or more first beams are determined based on 2L spatial domain basis vectors, and M−1 or more first beams are determined based on a preset spatial domain basis vector and M−1 frequency domain basis vectors;

the preset spatial domain basis vector is one of the 2L spatial domain basis vectors.

15. The terminal of claim 12, wherein the receiving beamformed CSI-RSs, or the beamformed CSI-RSs and frequency domain basis vector indication information transmitted by a network side by means of antenna ports, comprises:

receiving second beamformed CSI-RSs and frequency domain basis vector indication information transmitted by the network side by means of the antenna ports;

wherein second beams used in beamforming the second CSI-RSs are determined based on all the spatial domain basis vectors and a part of the frequency domain basis vectors, and the frequency domain basis vector indication information is configured to indicate the other part of the frequency domain basis vectors.

16. The terminal of claim 12, wherein the determining the port indication information and the port combination coefficients for data transmission based on the multiple effective channel information, comprises:

performing eigenvalue decomposition on a covariance matrix of the multiple effective channel information to obtain eigenvectors corresponding to the largest eigenvalues, the number of which is that of the downlink transmission layers;

selecting, from eigenvectors corresponding to any downlink transmission layer, non-zero elements with the largest amplitude, the number of which is not greater than a preset number of ports, to obtain the port combination coefficient of the any downlink transmission layer; and determining the port indication information for data transmission of the any downlink transmission layer based on the port to which an effective channel corresponding to the port combination coefficient of the any downlink transmission layer is applied;

wherein the selecting, from eigenvectors corresponding to any downlink transmission layer, non-zero elements with the largest amplitude, the number of which is not greater than the preset number of ports, to obtain the port combination coefficient of the any downlink transmission layer, comprises:

selecting, from eigenvectors corresponding to any downlink transmission layer, non-zero elements with the largest amplitude, the number of which is not greater than the preset number of ports; and normalizing and quantizing the non-zero elements with the largest amplitude, the number of which is not greater than the preset number of ports, to obtain the port combination coefficient of the any downlink transmission layer.

17. The terminal of claim 11, wherein before the beamformed CSI-RSs, or the beamformed CSI-RSs and the frequency domain basis vector indication information are transmitted to the terminal by means of the antenna ports, sounding reference signals (SRSs) transmitted by the terminal are received; and the spatial domain basis vectors and the frequency domain basis vectors corresponding to the uplink channel are determined based on the SRSs.

18. A network side, comprising a memory, a processor, and a program stored in the memory and executable on the processor, wherein the program, when being executed on the processor, causes the processor to implement the steps of the method of claim 8.

19. The network side of claim 18, wherein the transmitting beamformed CSI-RSs, or the beamformed CSI-RSs and frequency domain basis vector indication information to a terminal by means of antenna ports, comprises:

transmitting first beamformed CSI-RSs to the terminal by means of the antenna ports;

wherein first beams used in beamforming the first CSI-RSs are determined based on all spatial domain basis vectors and all frequency domain basis vectors;

wherein the number of the spatial domain basis vectors is 2L, the number of the frequency domain basis vectors is M, and both L and M are positive integers;

the number of the first beams is not less than 2L+M−1;

wherein 2L or more first beams are determined based on 2L spatial domain basis vectors, and M−1 or more first beams are determined based on a preset spatial domain basis vector and M−1 frequency domain basis vectors; and the preset spatial domain basis vector is one of the 2L spatial domain basis vectors; or transmitting second beamformed CSI-RSs and frequency domain basis vector indication information to the terminal by means of the antenna ports;

wherein second beams used in beamforming the second CSI-RSs are determined based on all the spatial domain basis vectors and a part of the frequency domain basis vectors, and the frequency domain basis vector indication information is configured to indicate the other part of the frequency domain basis vectors.

20. The network side of claim 18, wherein before the beamformed CSI-RSs, or the beamformed CSI-RSs and the frequency domain basis vector indication information are transmitted to the terminal by means of the antenna ports, sounding reference signals (SRSs) transmitted by the terminal are received; and the spatial domain basis vectors and the frequency domain basis vectors corresponding to the uplink channel are determined based on the SRSs.

* * * * *